US012590020B2

(12) United States Patent
Van Dijk et al.

(10) Patent No.: US 12,590,020 B2
(45) Date of Patent: Mar. 31, 2026

(54) AEROBIC BIOLOGICAL WASTEWATER TREATMENT IN A CONTINUOUS FLOW REACTOR

(71) Applicant: HaskoningDHV Nederland B.V., Amersfoort (NL)

(72) Inventors: Edward John Henrik Van Dijk, Amersfoort (NL); Mario Pronk, Delft (NL); Viktor Albert Haaksman, Leiden (NL)

(73) Assignee: HaskoningDHV Nederland B.V., Amserfoort (NL)

( * ) Notice: Subject to any disclaimer, the term of this patent is extended or adjusted under 35 U.S.C. 154(b) by 344 days.

(21) Appl. No.: 18/256,236

(22) PCT Filed: Dec. 10, 2021

(86) PCT No.: PCT/NL2021/050758
§ 371 (c)(1),
(2) Date: Jun. 7, 2023

(87) PCT Pub. No.: WO2022/124901
PCT Pub. Date: Jun. 16, 2022

(65) Prior Publication Data
US 2024/0018025 A1      Jan. 18, 2024

(30) Foreign Application Priority Data
Dec. 10, 2020    (NL) ...................................... 2027088

(51) Int. Cl.
*C02F 3/30*          (2023.01)
*C02F 3/00*          (2023.01)

(52) U.S. Cl.
CPC ........ *C02F 3/302* (2013.01); *C02F 2003/001* (2013.01); *C02F 2203/004* (2013.01); *C02F 2209/40* (2013.01); *C02F 2305/06* (2013.01)

(58) Field of Classification Search
CPC .... C02F 2203/004; C02F 3/301; C02F 3/302; C02F 2003/001; C02F 2209/40; C02F 2305/06
(Continued)

(56)                References Cited

U.S. PATENT DOCUMENTS

2007/0158265 A1      7/2007    Cote et al.
2020/0002201 A1*     1/2020    Stinson ................... C02F 3/286

FOREIGN PATENT DOCUMENTS

CN          105936542 A      9/2016
JP          2004-255269 A    9/2004
(Continued)

OTHER PUBLICATIONS

Corsino, S. F., Campo, R., Di Bella, G., Torregrossa, M., & Viviani, G. (2016). Study of aerobic granular sludge stability in a continuous-flow membrane bioreactor. Bioresource Technology, 200, 1055-1059.
(Continued)

*Primary Examiner* — Claire A Norris
(74) *Attorney, Agent, or Firm* — Ipsilon USA—NLO

(57)                ABSTRACT

Provided herein is a method for the purification of substrate-containing wastewater in a continuous flow-through aerobic biologically activated sludge reactor B, in which at least part of biological sludge 6 is conditioned in a selector under anaerobic or anoxic conditions with at least part of the substrate-containing, to-be-purified wastewater, optionally after a pre-treatment step of the supplied wastewater, such that at least 20 wt % of the sludge in the selector has a residence time in the selector which is at least 20% greater than the hydraulic residence time of the sludge/water mixture in the selector, after which the thus conditioned sludge/water mixture, optionally after an additional anaerobic or anoxic contact step, is fed to the aerobic purification reactor
(Continued)

and subjected to aerobic treatment, in which the treated wastewater after aerobic treatment is optionally separated from the sludge by settling, flotation or mechanical separation, and in which at least a portion of the sludge separated from the aerobically treated wastewater is returned to the selector as return sludge.

15 Claims, 9 Drawing Sheets

(58) Field of Classification Search
USPC ........................................................ 210/605
See application file for complete search history.

(56) References Cited

FOREIGN PATENT DOCUMENTS

| | | | | |
|---|---|---|---|---|
| JP | 2012-106198 A | 6/2012 | | |
| WO | WO-2019046416 A1 * | 3/2019 | ............ | C02F 3/1226 |
| WO | WO 2020/076755 A1 | 4/2020 | | |
| WO | WO 2020/205834 A1 | 10/2020 | | |

OTHER PUBLICATIONS

Kent, T. R., Bott, C. B., & Wang, Z. W. (2018). State of the art of aerobic granulation in continuous flow bioreactors. Biotechnology advances, 36(4), 1139-1166.

Cofré, C., Campos, J.L., Valenzuela-Heredia, D., Pavissich, J.P., Camus, N., Belmonte, M., Pedrouso, A., Carrera, P., Mosquera-Corral, A. and Del Rio, A.V., 2018. Novel system configuration with activated sludge like-geometry to develop aerobic granular biomass under continuous flow. Bioresource technology, 267, pp. 778-781.

Wei, S.P., Stensel, H.D., Quoc, B.N., Stahl, D.A., Huang, X., Lee, P.H. and Winkler, M.K., 2020. Flocs in disguise? High granule abundance found in continuous-flow activated sludge treatment plants. Water Research, 179, p. 115865.

Jahn, L., Svardal, K. and Krampe, J., 2019. Comparison of aerobic granulation in SBR and continuous-flow plants. Journal of environmental management, 231, pp. 953-961.

Tremblay et al., Phosphorus Accumulating Organisms Utilization of Volatile Fatty Acids Produced By Fermentation of Anaerobic Mixed Liquor, Jan. 2005 Proceedings of the Water Environment Federation 2005(9):5971-5986.†

* cited by examiner
† cited by third party

Fig. 10

AEROBIC BIOLOGICAL WASTEWATER TREATMENT IN A CONTINUOUS FLOW REACTOR

The invention lies in the field of aerobic biological wastewater purification in a continuous flow-through reactor with aerobic granular sludge.

BACKGROUND

To protect the aquatic environment, the biological treatment of wastewater from houses, cities and industrial activity is an important activity. A large number of biological purification technologies are known and these can be broadly divided into anaerobic and aerobic technologies. Both technologies use micro-organisms that use the contaminants in the wastewater as a substrate and thus convert them into less harmful substances. In anaerobic technologies, the microorganisms (MO) thrive without adding significant oxygen to the mixture of MO and wastewater. The MO mainly convert the contaminants into methane gas and growth of the MO. Examples of such anaerobic technologies are BioBulk, UASB, EGSB and anaerobic MBR. The advantage of this class of technology is that the methane gas can be utilized. The main disadvantage, however, is that the wastewater treatment performance is rather limited and subsequent treatment in an aerobic technology is often necessary for adequate protection of the aquatic environment. It is noted that the invention presented below is not part of this anaerobic class of purification technologies.

In aerobic technologies, oxygen is supplied to the MO in one way or another, for example by introducing air through surface aerators, through bubble aerators, or otherwise. The aerobic MO mainly convert organic carbonaceous contaminants into carbon dioxide and growth of MO.

In addition, there are aerobic technologies in which the process conditions are set up in such a way that, in addition to aerobic MO, also MO can flourish that are able to remove nutrients such as nitrogen and phosphate from the wastewater. Such process conditions often include so-called anaerobic and anoxic conditions. In anoxic conditions, in addition to organic contaminants, also oxidized nitrogen compounds such as nitrite and nitrate are present where MO can flourish that convert these into harmless nitrogen gas. Under the so-called anaerobic conditions, the concentration of such oxidized nitrogen compounds is limited or not present at all. Under such conditions, MO that can store phosphate can flourish, for example like the MO of the PAO (phosphate accumulating organisms) class. It should be noted that although the term "anaerobic" for these process conditions is commonly used and is similar as in anaerobic purification technologies, it represents a very different class of MO and should not be confused with those in the anaerobic purification technologies described above, which mainly produce methane. It should be noted that there are also specific MO that can convert ammonium with nitrite into nitrogen gas. This class of MO are often referred to as Anammox (anoxic ammonium oxidizers). This class of MO cannot flourish in the presence of carbonaceous contaminants, nor can it remove these important contaminants. Technologies that use anammox MO therefore do not belong to aerobic wastewater treatment, but often require such an aerobic purification technology component as a pre-treatment to produce nitrite from ammonium or organic nitrogen contaminants.

A commonly used, and until recently, worldwide most widely applied technology for aerobic wastewater purification is the so-called continuous (or flow-through) activated sludge system. The so-called Carousel technology as described in EP0474296 is one example of such embodiments. The MO grows in the form of sludge flocs, which are circulated together with the wastewater around in the Carrousel purification reactor and in this way are exposed to both aerobic and anoxic conditions. There are also Carousel embodiments that have an upstream anaerobic reactor to enable growth of the PAO MO in the circulating activated sludge. After removal of the contaminants from the wastewater by the MO in the activated sludge (AS), the AS is separated from the water by settling, flotation, membrane filters or other means, and the AS is returned to the aerobic, anoxic and/or anaerobic process conditions. In order for the separation of the AS to proceed properly and quickly, it is important that the AS has good settling properties. That is why so-called sludge selectors are often used in AS systems, in which the recycled AS is well mixed with untreated wastewater in order to inhibit the growth of so-called filamentous MO, which have poor settling properties. Such sludge selectors are available in numerous embodiments, can comprise of one or more compartments or reactors, are always well mixed and can operate with or without aeration. Also, the contact time of non-aerated sludge selectors can be extended by integration or consecutive non-aerated contact tanks to stimulate the growth of PAOs. Characteristic of these sludge selectors—with or without integrated or consecutive non-aerated contact tank—is that the activated sludge and water are mixed well and the residence time of the sludge in the sludge selector is the same as the residence time of the sludge/water mixture. Expressed differently: the sludge residence time (SRT) is the same as the hydraulic residence time (HRT). Another characteristic is to control that all the sludge in the sludge selector has the same SRT and, if there is unexpectedly a limited distribution in SRT, this distribution is comparable for sludge particles of different sizes. It is noted that the invention presented below does not relate to this kind of sludge selectors where HRT=SRT.

A new class in aerobic active sludge systems makes use of granular sludge instead of flocculant activated sludge. Scientifically, aerobic granular sludge is defined as sludge with a size of at least 0.212 mm and typically smaller than 6 mm, whereby no coagulation takes place during settling, and subsequently the sludge volume index (a measure of the settling properties of sludge) after 5 minutes of settling is comparable to the index after settling for 30 minutes. The main advantages are that the aerobic granular sludge settles much faster (4-40 m/h) than flocculent activated sludge (0.5-2 m/h) and that, if the granules are sufficiently large, the above-mentioned necessary anoxic and anaerobic conditions for nutrient removal arise; even if the granular sludge is aerated and the aerobic MO in the outer layer of the granule decompose the organic, carbonaceous contaminants, it is thus possible to simultaneously denitrify and fixate phosphate deeper in the granule. Compared to activated sludge systems, therefore, no, or significantly less, circulation and propulsion is required to expose the sludge to the various required conditions, resulting in energy savings of 20-50%. This however requires that the sludge, depending on the aeration conditions applied, has a granular size of 0.4 mm and preferably a size of greater than 1 mm (and preferably less than 6 mm), otherwise no or insufficient denitrification capacity is achieved deeper within the granule. In addition, the construction costs for granular sludge treatment plants are significantly lower than for activated sludge systems. On the one hand, less hydraulic residence time is required in the purification reactor and clarifier as a result of the rapid settling of the sludge, and on the other hand the amount of MO is much higher, as a result of the good settling characteristics of the granular sludge. For comparison, where activated sludge systems often use an MO concentration between 3-5 g/l, this is 8-20 g/l for granular sludge systems.

The first granular sludge technology widely applied in practice for the aerobic purification of wastewater is described in WO2004/024638. To achieve transition from activated sludge into granular sludge, and to maintain the granules during the purification process, there are a number of important process-technical conditions. It is essential that the granular sludge is exposed to an "anaerobic" phase (anaerobic here refers to "without aeration"; strictly speaking, this phase can also be anoxic (in the presence of nitrate)) so that the MO can absorb organic carbonaceous contaminants. During the aerobic treatment, this absorption is important to enable the MO to consume particularly the absorbed carbonaceous contaminants, which is an important condition for achieving granule formation. In addition, this carbon is needed to convert oxidized nitrogen compounds into nitrogen gas in the anoxic and anaerobic parts of the granule. Furthermore, it is important to limit the amount of flocculent activated sludge. Since—after absorption in the aforementioned anaerobic phase—a part of carbon contaminants also remains in the wastewater, this will result in the growth of a limited amount of activated sludge flocs. To create these important process conditions, WO2004/024638 uses a purification reactor with discontinuous wastewater feed, a reactor in the Sequencing Batch Reactors (SBRs) class. In a first phase, the wastewater is fed to the reactor from the bottom, so that the undiluted wastewater comes into contact with the granules which can absorb the organic substances. Subsequently, the supply of wastewater is stopped and the supply of oxygen-containing gas is started. After the aerobic, anoxic and anaerobic biological conversions have occurred sufficiently to purify the wastewater to the desired water quality, the sludge with the worst settling properties, together with the formed flocculent sludge, is discharged from the reactor. The segregation between the flocs, the worse and the better settling sludge is achieved by discharging sludge only after a certain degree of sludge settling has already occurred and by discharging the sludge from the upper part of the reactor. In professional literature, this segregation is also referred to as selection pressure.

Since the first practical implementation of aerobic granular sludge and it method of operation and embodiment as originally described in WO2004/024638, the technology is, thanks to its many advantages, rapidly displacing application of activated sludge systems. However, a major drawback of this method and embodiment is that it takes place in SBRs, while a large part of the existing treatment plants was based on continuous activated sludge. The conversion from a continuous to a discontinuous fed reactor is not easy. Driven by the many advantages of granular sludge, and the aforementioned scientific insights into the crucial process conditions required for the formation of granular sludge, many attempts have been made to apply granular sludge also in continuous flow-through treatment reactors. For example, WO2017/025345 describes a process in which a separator is used to separate part of the activated sludge from the aeration tank of a continuous activated sludge system into two fractions, i.e. a faster-settling and slower settling part, and in which the faster settling part is mixed together in the anaerobic tank with the wastewater to be treated and the return sludge.

US2020/0002201 describes a continuous activated sludge system in which part of the activated sludge that is recycled from the final clarifier to the start of the continuous purification process is treated in an "incubator" prior to being circulated to the start of the continuous activated sludge system. The disclosed treatment method comprises application of anoxic and anaerobic conditions, whereby an additional carbon source is also provided by adding chemicals or by fermenting part of the sludge from the primary settling. In addition, at various locations in the process a separator is used to selectively discharge slower settling sludge. Like WO2004024638, this process provides for all conditions in order to achieve granule formation: there is an anaerobic phase and a selection pressure is imposed by the separator. However, publicly presented results of field tests with this process (IWA Innovation conference on sustainable wastewater treatment and resource recovery, Shanghai (November 2019)) show that the method does not result in extensive granulation: Only about 30% of all sludge turned out to be larger than the scientific lower granule limit of 0.212 mm, and more than 90% was smaller than 0.25 mm. The granular sludge fraction being sufficiently large to allow for the simultaneous denitrification described previously, which requires a granular size of at least 0.5 to 1 mm, was found to be almost negligible. As a result, only a small part of the potential benefits of granular sludge purification can be achieved in the continuous activated sludge process.

A similar process is presented in WO2019/195918. Here too, the sludge is circulated from the secondary settling to a separate compartment, a separate reactor or a series of reactors with anoxic conditions, after which the sludge is mixed together with raw wastewater in yet another compartment, a separate reactor or a series of reactors to be exposed to anaerobic conditions. WO2019/195918 also applies a selection pressure by discharging the lesser settling sludge into the sludge processing line. The disadvantages of US2020/0002201 described above also seem to play a role here.

Within the current state of art, there is a continuous need for further implementing and optimizing the method as described in WO2004/024638, and for achieving extensive granular sludge formation in continuous flow-through systems as described e.g. hereabove.

SUMMARY OF THE INVENTION

Experimentally, the inventors have established that—despite the use of a sludge selector as described above in the context of the Carrousel technology—and whether or not integrated or followed by a non-aerated tank—like in the prior art and by mixing sludge in an anaerobic tank with the untreated wastewater, whether or not preceded by an anoxic phase—it was not possible at industrial scale by aforementioned continuous systems to achieve that in a large part of the sludge is transformed and maintained to the desired granule size of at least 0.4-1.0 mm. In their research, however, the inventors established that there is a correlation between the granule size and the degree of distribution of the sludge residence time of individual sludge particles with different settling properties or size within the anoxic or anaerobic contact tank or selector. The inventors have subsequently used this surprising insight to develop an improved method and device embodiment for a continuously fed, flow-through aerobic biological purification reactor based on WO2004/024638 and WO2017/025345, in which, by deploying this sludge residence time distribution, normal activated sludge can be converted into sludge with extensive level of granule formation and which makes it, for the first time in practice, possible to match the advantages that previously could only be achieved in granular sludge technology using SBRs.

In practice, according to the inventors, this can be realized by using a selector under anaerobic or anoxic conditions prior to the aerobic purification, which actively provides, or controls, that the sludge with larger size and/or higher settling rate in the selector is longer contacted with the substrate-containing wastewater (i.e. longer than the sludge with smaller size and/or lower settling rate). This can be done, for example, by applying in the selector (i) multiple phases with discrete or discontinuous changes in flow velocity, (ii) an increasing flow gradient (i.e. continuously increasing flow velocity), or a combination of (i) and (ii). By both ways, a distribution in settling rate is achieved (allowing for fractions with lower and higher settling rates), while contact time and the concentration of substrate of the larger granules in contact with the wastewater are increased. This is an improvement over the process in WO2017/025345. The function of the selector is to allow at least a significant portion of the larger sludge granules a residence time that is longer than the hydraulic residence time of the conditioned sludge/water mixture, and preferably to expose the larger sludge particles to the higher substrate concentrations. Doing so, embodiment (i) with discrete changes in flow velocity is preferred. This can be achieved more advantageously in (a) a continuous form by providing at a constant water/sludge flow rate a variation in the flux with the flow direction of the selector, and/or (b) in a semi-batch step in which variation in the flow velocity in the selector is accomplished by variation in the water/sludge flow rate. The different embodiments (i)(a) and (i)(b) and (ii) are further elaborated in the detailed description and in the figures.

Within the advantageous wastewater treatment making use of aerobic granular sludge technology, the invention relates in particular to a method for the purification of substrate-containing wastewater in a continuous flow-through aerobic biologically activated sludge reactor, wherein at least part of the biological sludge is conditioned in a selector under anaerobic or anoxic conditions with at least part of the substrate-containing wastewater to be purified (whether or not after a conventional pre-treatment step of the received wastewater), such that at least 20 wt % of the sludge in the selector has a residence time in the selector that is at least 20% greater than the hydraulic residence time of the sludge/water mixture in the selector, and wherein preferably the larger sludge particles are in contact with the highest substrate concentration, after which the conditioned sludge/water mixture (whether or not after an eventual additional anaerobic or anoxic step) is fed to the aerobic purification reactor and subjected to (conventional) aerobic purification, wherein the treated (purified) wastewater after aerobic purification is separated from the sludge.

Doing so, sludge particles with a larger size and/or faster settling properties have a longer contact time with the substrate-containing wastewater than the sludge particles with a smaller size or lower settling properties. By using the selector, the conditioned sludge/water mixture (whether or not after an eventual additional anaerobic or anoxic step) is fed to the aerobic purification reactor, wherein at least 20 wt % of the sludge comprises granular sludge. Preferably the proportion of granular sludge is at least 25 wt %, preferably at least 30 wt % and most preferably at least 40 wt %, particularly at least 50 wt %; and preferably such that at least 20 wt % of this granular sludge (i.e. sludge with a size of at least 0.212 mm), or more preferably at least 25 wt %, preferably at least 30 wt % and most preferably at least 40 wt %, particularly at least 50 wt % of this granular sludge in the aerobic biological purification reactor B has a particle size of at least 0.4-1.0 mm.

The sludge that has been separated from the aerobically treated wastewater can be returned (as return sludge) to the selector. This return establishes the continuous character of the wastewater treatment, and ensures that an effective granular sludge size distribution is formed and maintained. In other words, in the above method, the sludge is treated in the selector under anaerobic or anoxic conditions such that the larger sludge particles have a longer contact time with the wastewater. In addition, preferably it is also achieved that the larger sludge particles in the selector have more contact with higher substrate concentrations than the smaller sludge particles. In practice, the substrate concentrate varies widely due to fluctuations in wastewater composition and uptake by the MO in the selector. Preferably, at least the largest 10 wt % of the sludge particles are contacted with the highest substrate concentration in the selector for at least 20% longer than the average contact time of the sludge and the substrate concentration is preferably at least 50% higher than the substrate concentration at which the smallest 15 wt % of the sludge particles are in contact with.

The in the context of the invetion aforementioned improved settling rate distribution and increase of both the contact time and the substrate contact concentration of the larger granules with the wastewater—and its associated characteristics are by using the selector achieved preferably within 200 days, more preferably achieved within 150 days after the start of deploying the method. As shown in FIG. 11B and FIG. 12A, FIG. 12A, without using the selector, these goals are not achieved after the start-up phase.

In one embodiment, the sludge/water mixture in the selector is subjected under anaerobic or anoxic conditions to discrete changes in flow velocity and/or a flow gradient. In a particular embodiment, discrete changes in flow velocity are achieved by discrete variation in flux within the flow direction of the selector and/or by discrete variation in the flow rate of the supplied wastewater and/or return sludge. The term 'discrete changes' in the context of the invention refers to (distinguishable) discontinuous changes in flow rate.

In a particular embodiment, the selector has a first step that separates under anaerobic or anoxic conditions a part of the sludge into a faster and a slower settling part, wherein the mixture of wastewater and faster or slower settling part is selected and this mixture is at least in a second, next step in the selector again separated into a faster and slower settling part. To carry out the separation in the different steps of the selector, selection based on settling rate is applied, preferably anytime in an upflow column, wherein the upflow velocity of the wastewater through the different steps of the selector can be individually and independently adjusted as a parameter. Doing so, discontinuous or discrete changes in flow velocity are accomplished. This can be achieved, for example, by means of an upflow column with concentrically arranged compartments that together form the selector. The upflow velocity in each step of the selector is preferably in the range of 1-25 m/h. Preferably, the upflow velocity in each step of the selector is lower than in the previous step, preferably in each case 25-50% of the upflow velocity in the previous step. Preferably, the selector has at least a third step in which the faster or slower settling part from the second step is further separated into a faster or slower settling part, after which the sludge-treated wastewater stream and the sludge are fed to a conventional purification reactor, and wherein the remaining portion is returned to a previous step of the selector. This third step is preferred to avoid accumulation of sludge that settles too rapidly. This multiplicity of sludge separation steps based on settling velocity/variation in flow rate in the anaerobic selector achieves the aim that at least 20% of the sludge in the selector has a residence time in the selector that is at least 20% greater than the hydraulic residence time of the sludge/water mixture in the selector. Also the aim is achieved that at least the largest 10 wt % of the sludge particles are contacted with the highest substrate concentration in the selector for at least 20% longer than the average contact time of the sludge, while this substrate concentration is at least 50% higher than the substrate concentration to which the smallest 15 wt % of the sludge particles are in contact with. Such an embodiment is schematically shown in FIGS. 2a -2c.

In another embodiment, the selector is a semi-batch step in which the sludge is contacted with wastewater in a reactor under anaerobic or anoxic conditions, and wherein the feed rate is varied.

In another particular embodiment, the selector separates by means of creating a gradient (increasing or decreasing) in flow velocity, causing a continuous separation of sludge downstream based on settling velocity by the selector, such that the sludge residence time in the selector increases with increased settling rate. To achieve the aim, the gradient can be adjusted accordingly. Such embodiments are shown schematically in FIGS. 3-6. In these cases, a continuous increase in flow rate is provided.

In each of these embodiments, the target is that at least 20 wt % of the sludge in the selector has a residence time in the selector that is at least 20% greater than the hydraulic residence time of the sludge/water mixture in the selector. Preferably the proportion of granular sludge (being sludge with a size of at least 0.212 mm) in the aerobic biological purification reactor B is even at least 25 wt %, preferably at least 30 wt % and most preferably at least 40 wt %, particularly at least 50 wt %; and preferably at least 20 wt % of this granular sludge (i.e. sludge with a size of at least 0.212 mm), or more preferably at least 25 wt %, preferably at least 30 wt % and most preferably at least 40 wt %, particularly at least 50 wt % of this granular sludge has a particle size of at least 0.4-1.0 mm. In addition, preferably it is also achieved that the larger sludge particles in the selector have more contact with higher substrate concentrations than the smaller sludge particles. The person skilled in the art is able to adjust feed velocity and flow rate parameters to achieve these goals.

In any of these embodiments, accumulative build-up of sludge in the selector can be prevented by periodically increasing the extent of mixing or flow rate for an adjustable amount of time to also direct the more rapidly settling sludge to the downstream aerobic reactor. Furthermore, in any of the embodiments, the proportion of sludge flocs can be further reduced by withdrawing at least a portion of the wasted surplus sludge from the location in the selector where the proportion of poorest settling sludge particles is greatest. Preferably this mixing takes place at a frequency of not more than 2 times per hour, more preferably not more than 1 time per hour and even more preferably not more than 1 time per 4 hours. The duration of this mixing is dependent on several factors, including the hydraulic residence time, and is preferably at least 5 minutes and more preferably at least 15-30 minutes.

BRIEF DESCRIPTION OF THE DRAWINGS

FIG. 10 shows an embodiment where a selector is integrated into an aerobic granular sludge (AGS) reactor operating as Sequential Batch System (SBR) and connected to a continuous flow-through conventional system.

FIG. 12B showing a configuration according to FIG. 8b.

DESCRIPTION OF THE PROCESS AND EMBODIMENTS

Below, various possible working and embodiments of the invention are presented, all with the aim of achieving granulation through improved distribution in sludge retention time—as described above. The skilled person will recognize that the described methods and embodiments have in common that a significant distribution in sludge residence time is achieved, and that this distribution is combined with contacting the sludge with untreated wastewater or polluted side-streams in such a way that the largest sludge particles are exposed to prolonged contact and to higher substrate contact concentrations. The skilled person will also recognize that the methods described do not exclude variants, alternatives and other embodiments that achieve the same effect and that such embodiments and similar methods are part of the same invention.

Figure 1:
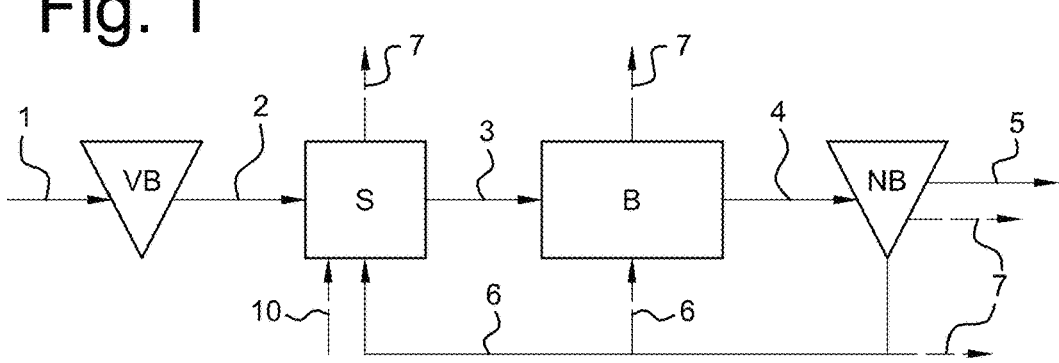
FIG. 1 shows the basic principle of the improved continuous flow-through biological purification according to the invention.

FIG. 1 shows the basic principle of the improved continuous flow-through biological purification according to the invention. Wastewater 1 is—if desired—first pretreated in primary settling tank VB and is then fed via 2 to selector S and mixed here with return sludge 6. From the selector S, the wastewater/sludge mixture flows to the biologically activated sludge treatment reactor B, after which the sludge from the purified wastewater/sludge mixture 4 is preferably separated from the treated wastewater in secondary settler NB 5 and at least partly (as 6) returned to the selector. Part of the sludge that grows during the purification process is discharged from the process. This surplus sludge discharge 7 can take place at different process locations, or a combination of locations.

The skilled person will appreciate that the pretreatment VB can have various embodiments such as, but not limited to screens, sieves, filters, cyclones, gravity settlers, lamella settlers, flotation devices, etc. The biological purification reactor B can be any conventional embodiment of a continuous flow-through activated sludge reactor, including, but not limited to oxidation ditch, plug flow, CSTR, Bardenpho, UCT, etc. Such biological purification reactor usually also has compartments or sub-reactors in which both aerobic, anoxic and anaerobic conditions are maintained.

In the context of the invention, stream 6 is represented interchangeably as biological sludge, sludge and return sludge. As elaborated later in FIG. 10, in the method according to the invention at least a part of the return sludge can originate from a conventional wastewater treatment.

In this embodiment, the desired distribution in sludge residence time is achieved by variation in the flux towards the flow direction. The selector S is preferably a compartmentalized upflow reactor with concentrically oriented compartments, as shown in the cross-section in FIG. 2A, in which the effective volume of compartment Sa is smaller than that of Sb and that again smaller than that of Sc. In an alternative form (in FIG. 2B) a selector is applied with 3 adjacent and connected compartments Sa, Sb and possibly Sc with adjusted volumes, where the effective volume of compartment Sa is smaller than that of Sb. Both in FIG. 2A as 2B, it is also possible to work with only compartments Sa and Sb. (Return) sludge 6 is introduced at the level of the bottom in compartment Sa, where it is brought into contact with at least part of the wastewater 2. The remaining part of the wastewater 2 is introduced at the bottom of the other compartments. Due to the vertical flow in compartment a, a significant sludge retention time distribution is deliberately achieved, as a result of the sludge retention time of the individual sludge particles, which is determined by their individual settling properties. Particles with settling characteristics (settling velocity) that are much lower than the vertical flow velocity will leave compartment a with the upwards flow and do not remain longer in this compartment than the residence time of the water in this compartment. However, sludge particles that have settling properties that are higher than the liquid velocity, stay in the compartment longer than the water, and the fastest settling sludge particles accumulate at the bottom of the compartment Sa, from where they flow to compartment Sb. The MO important for the formation of granular sludge can, due to the contact with the nutrient-rich water and the anoxic or anaerobic conditions, preferentially take up the substrate and the sludge particles with the best settling properties thus acquire a biological selection advantage for growth towards, and to remain, granular sludge.

The sludge particles will then—dependent on their settling rate—enter through the overflow or underflow of compartment Sa into compartment Sb. The fluid velocity in chamber Sb is lower than in compartment Sa. This will again impose a significant sludge retention time distribution to the sludge, and just as importantly, sludge with the best settling properties will have more contact time and is exposed to more concentrated wastewater. After all, particles that have a settling velocity that is comparable to the liquid velocity remain in the compartment just as long as the liquid and make for a relatively shorter period of time contact with the less undiluted wastewater in the lower part of the compartment. Faster settling parts, together with the best settling particles from the bottom of compartment a, can stay significantly longer in the lower part of compartment Sb and take up further substrate. A similar effect occurs in compartment Sc, which is fed from compartment Sb via the bottom and overflow. Here too, the individual sludge particles that settle more quickly come into contact with the most concentrated wastewater for the longest time. It goes without saying that the selector can be expanded with further compartments (Sd, Se, . . . ) according to the same principle.

In order to prevent accumulation of too rapid settling of sludge particles in the last compartment (in FIGS. 2A and 2B that is compartment Sc), this compartment is preferably continuously or intermittently mixed with a mixer M. This mixing can be achieved by using a mechanical agitator or propulsion, but also by introducing a gas or by sizing the latter compartment in such a way that the resulting vertical liquid flow rate is larger than in compartment a. Despite the fact that this gas can also be oxygen or oxygen-containing gas, the selector is considered to be an anaerobic or anoxic reactor as the gas in the last compartment will at most reduce the effective anaerobic contact time of the selector.

The sizes and resulting velocities within the compartments are chosen such that the aforementioned targeted level sludge residence time distribution occurs.

Figure 2A:
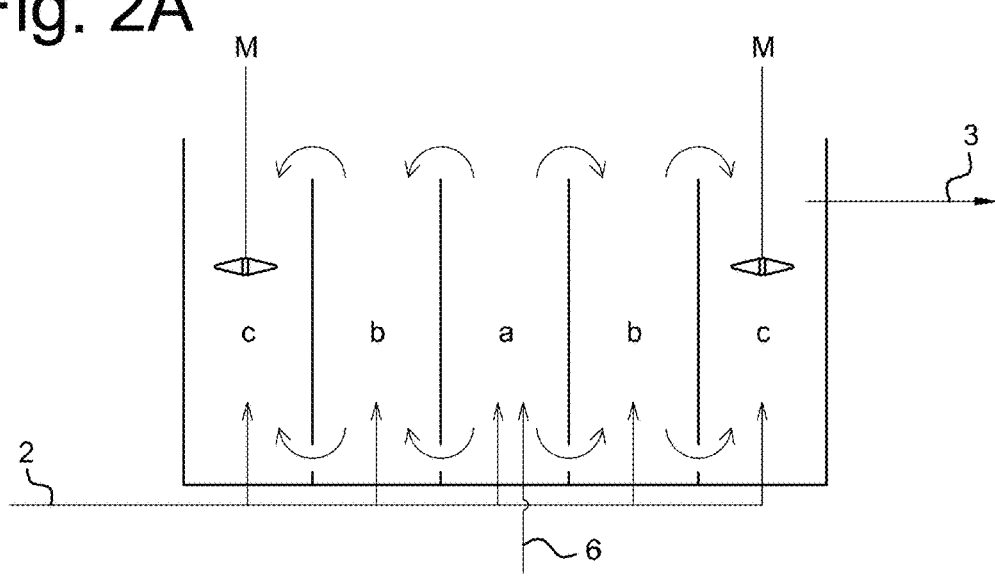
FIG. 2A shows a compartmentalized upflow reactor with concentrically oriented compartments.
Figure 2B:
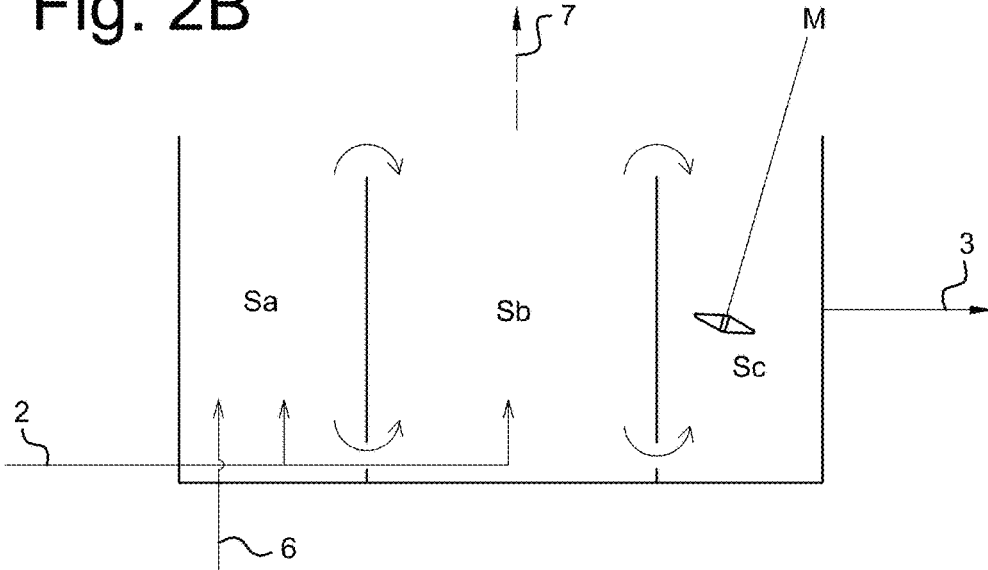
FIG. 2B shows an alternative form of a compartmentalized upflow reactor in which a selector is applied with three adiacent and connected compartments.
Figure 2C:
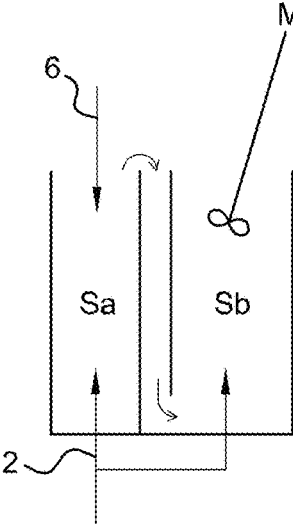
FIG. 2C shows a further alternative in which the dividing wall between the compartments does not have an opening between the compartments at the bottom.

In the schematic representations in FIGS. 2a-2C, in addition to compartment Sa, also two further compartments Sb and Sc are shown. Based on the information given here, the skilled person will recognize that for implementing the invention at least one further compartment Sb is necessary, but that also more further compartments (Sb, Sc, Sd, Se . . . . ) can be used for further optimize performance and operational robustness. With increased number of further compartments, the possibilities for further increasing and controlling the sludge residence time distribution also increase. This also applies to the method of compartmentalisation and how the required flow pattern and mixing are achieved in the relevant compartments. For example, a quadrangular tank is preferably designed with compartment Sa and only one further compartment Sb. Optionally, the overflow from a further compartment is transferred via a conduit to the lower part of a further (preferably adjacent) compartment.

By the way, the inflow of wastewater 2 can also take place from the bottom of the compartment and the supply of return sludge 6 at the level of the liquid in the compartment. In this case, the dividing wall between the compartments does not need to have an opening between the compartments at the bottom. This is shown in FIG. 2C for compartment Sa only.

The liquid velocity of the wastewater 2 in compartment Sa is chosen such that the sludge particles in 6 are flushed out into compartment Sb. Sludge particles with a higher settling velocity stay longer in this compartment Sa before being washed out with the upwardly flowing wastewater than particles with a lower settling rate. Thus, the desired distribution in contact time and substrate contact concentration is also achieved. As shown in FIG. 2A, several compartments with a wastewater feed on the bottom can succeed each other.

Figure 3:
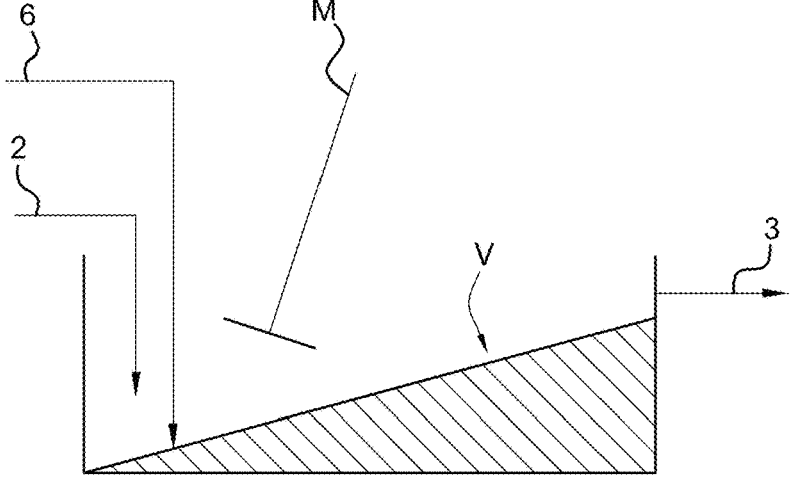
FIG. 3 shows another variant of a reactor, in which the selector has a sloped floor.

FIG. 3 shows another preferred variant, in which the selector S is designed with a sloped floor v, whereby the liquid velocity increases with the flow. Wastewater 2, and (return) sludge 6 is brought into intimate contact with each other at the entrance side, wherein the wastewater preferably is evenly distributed over the bottom, or this optionally is achieved by a mixer M. The water/sludge mixture then flows to the right (in the direction of the sloped floor v) whereby the liquid velocity increases steadily. The fastest settling sludge particles can concentrate around the bottom at the start of the selector and then move with the increasing flow velocity via the sloping floor v to the start of the selector. Sludge particles that settle less quickly will have a shorter residence time in the selector via 3. Thus, the desired distribution in sludge residence time is obtained.

Figure 4A:
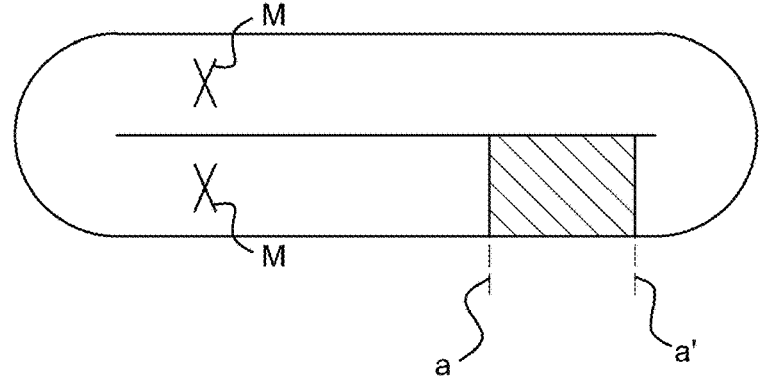
FIGS. 4A-4C show the variant of FIG. 3 integrated in a circulation or plug flow activated sludge system.
Figure 4B:
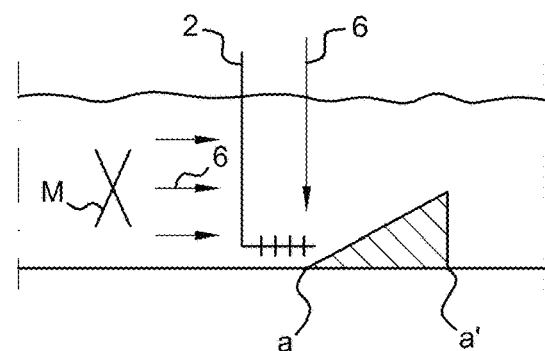
Figure 4C:
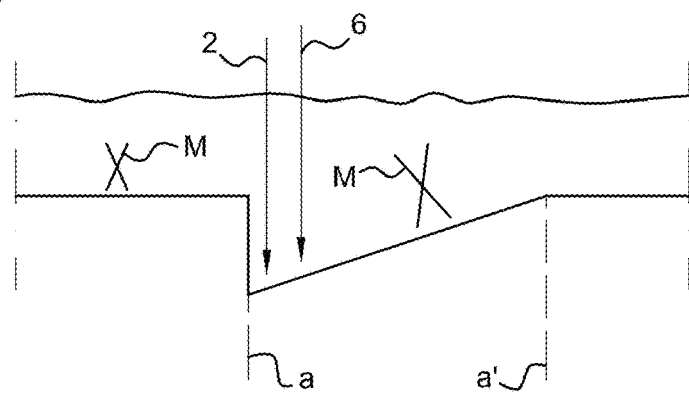

One skilled in the art will recognize that this preferred variant can also be used integrated in a circulation or plug flow activated sludge system, as illustrated in FIGS. 4A, 4B and 4C. FIGS. 4B and 4C is a side view, FIG. 4A is the top view. FIG. 4B shows how the preferred variant of FIG. 3 can be embodied by providing an ascending elevation or deflection baffle between segment a and a' of a circulating activated sludge system. This deflection baffle increases the flow velocity over the deflection baffle and sludge particles with a sufficiently high settling velocity (ie a settling velocity that is higher than the flow velocity) flow upstream the defection baffle, or at least more slowly downstream, and thus brought into contact for a longer period of time with the wastewater that is entered before or at the beginning of the deflection baffle. Periodically, the mixer or impeller is operated for some time. Depending on preference, (return) sludge 6 can be supplied just before (as in FIG. 4b) or after the baffle (as in FIG. 6b, described below), or at any other location, for example via the existing return sludge inlet. It is important in this embodiment that sufficient anaerobic time is obtained in segment a to a' for hydrolysis and adsorption of the organic contaminants by the sludge. FIG. 4C illustrates how the same is accomplished by an, in the flow direction, inclination in a recessed bottom for segment a and a'. Of course, in segments of plug flow systems this can be applied likewise.

As with the aforementioned preferred variant, further distribution of the sludge residence time is favoured by the variations in wastewater flow rate during the day and to prevent accumulating accumulation of the best-settling sludge particles in the selector the mixer or propulsor can be operated periodically.

Figure 5:
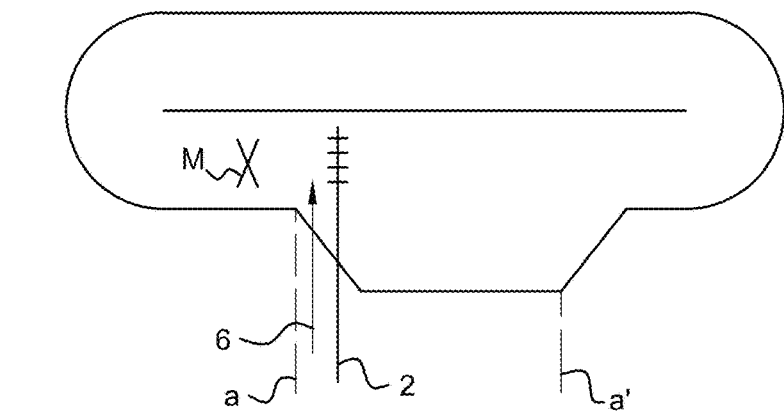
FIG. 5 shows a further embodiment in which the sludge residence time distribution in a circulating or plug flow system is obtained by applying a partial widening ofthe channel width.

In another preferred variant, the sludge residence time distribution in a circulating or plug flow system is obtained by applying a partial widening of the channel width, resulting in a variation of the liquid velocity and settling of the best-settling sludge particles towards the bottom. See FIG. 5. This is an intermediate form of the discontinuous variation in flow rate, and the continuous flow gradient.

Figure 6A:
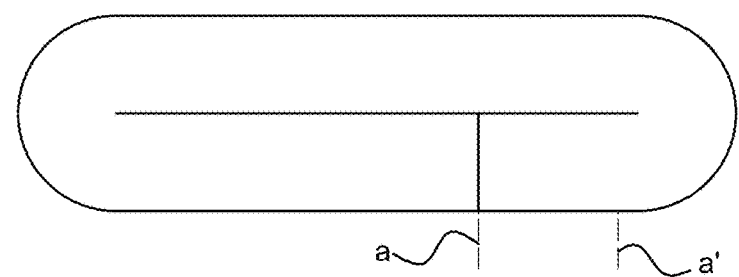
FIGS. 6A-GB show a further variant of a reactor.
Figure 6B:
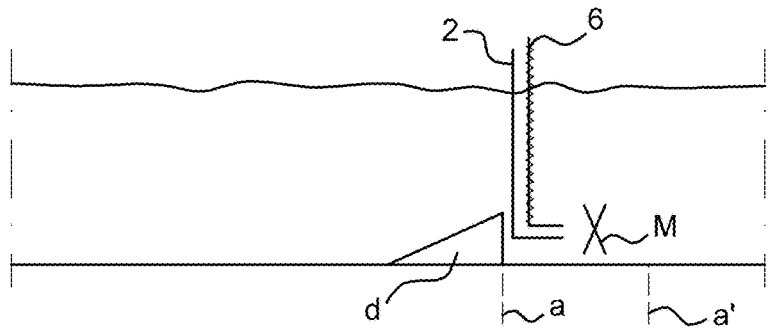

For the installation of the selector in existing situations, it can be in practise constructively difficult or not cost-effective to apply the previously presented preferred variants. In that case, the preferred variant as shown in FIGS. 6a-6b is favoured. The operation is identical to that of FIG. 4a or 4b, but the liquid velocity increase is created here by placing a deflection baffle d before wastewater and return sludge enters. Due to the reduction in flow velocity just after this baffle, the larger granules will here settle towards the bottom and make contact with food. Likewise in the aforementioned integration, in this variant it is important that in segment a to a' sufficient anaerobic time is obtained for hydrolysis and adsorption of the organic contaminants by the sludge.

Figure 7:
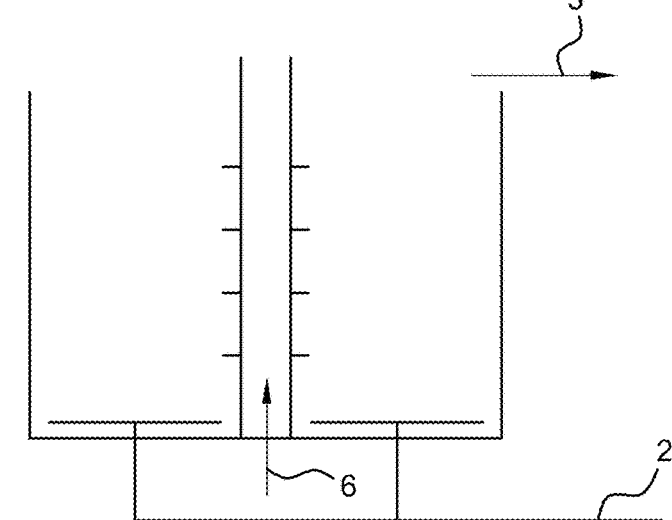
FIG. 7 shows a further variant of a reactor, in which the wastewater is distributed overthe bottom of the selector and (return) sludge is introduced via a pipe with lateral openings at different heights.

In another preferred variant, as illustrated in FIG. 7, the wastewater 2 is distributed over the bottom of the selector S and (return) sludge 6 is introduced via a pipe with lateral openings at at least 3 different heights. Through these openings, the sludge comes into contact with wastewater. The desired distribution in sludge residence time is obtained because the faster settling sludge particles come into contact with wastewater at a greater depth in the selector.

Figure 8A:
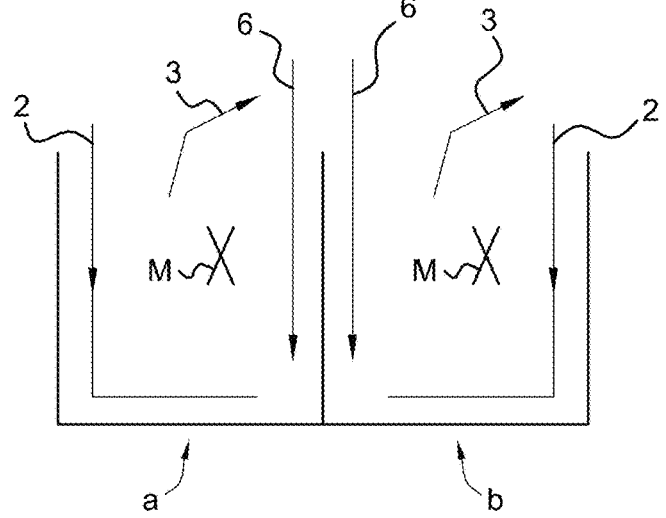
FIGS. 8A-8B show a further variant with two selector compartments in which feeding wastewater and (return) sludge alternates with discharge ofthe conditioned sludge.
Figure 8B:
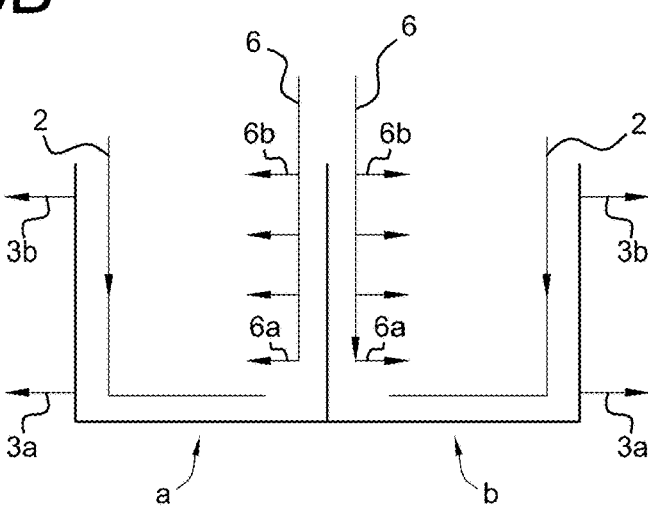

In another preferred variant, schematically represented in FIGS. 8A and 8B, the desired distribution in sludge residence time in the selector S is obtained by using at least two selector compartments Sa and Sb in which feeding wastewater 2 and (return) sludge 6 alternates with discharge of the conditioned sludge, and wherein the desired distribution in sludge residence time in the selector S is obtained by feeding the compartments with wastewater 2 at the bottom of the compartment and wherein discharge of the conditioned sludge can be achieved by applying variation in flow velocity, and/or applying mixing, and/or takes place through withdrawing at least a part of the sludge/wastewater at the level of the bottom of the compartment (3a), while optionally providing sludge 6 at the level of the liquid in the compartment (6b) and/or somewhere in between the bottom level (6a) and the liquid level of the compartment.

Using these two Selector compartments Sa and Sb and alternative wastewater and (return) sludge supply, mixer(s) M can be used. This embodiment is shown in FIG. 8A. The wastewater 2 is introduced at the bottom level of the compartment. The return sludge 6 is supplied at one or more heights between the compartment bottom and liquid level. In FIG. 8A only the option of supplying the sludge at the bottom has been drawn, but this option of dividing in terms of 6a and 6b and optionally further sludge supply inbetween (FIG. 8B) can be applied there too. During feeding, the mixer/propulsor is not in use and the water/sludge mixture overflows through outlet 3 and the sludge bed is stratified based on settling properties. The smallest sludge particles move upwards with the flow, the heavier, larger particles move against it and have longer contact with the substrate-containing wastewater. The conditioning here takes place by the upflow and/or discontinuous variation in the flow velocity. After the desired anaerobic contact time is achieved, the feeding is continued for a desired period, but now with mixer M in operation, so that the sludge/water mixture 3 is fed to the continuous flow-through biological reactor. In order to maintain the continuous character of the wastewater treatment, at least 2 compartments are operated alternatingly, so that a continuous discharge of conditioned sludge/wastewater 3 is assured. Also, likewise as in previously described variants, instead of using a mixer M, the transport of the larger sludge particles to reactor B can also be achieved by using a pump, Archimedes screw, air lift, coarse bubbles or the like.

Aforementioned variant can also be configured and operated without mixer M. This is shown in FIG. 8B. Like in the aforementioned variant, the sludge 6 can be either supplied at the level of the bottom of the compartment (6a), or at the level of the liquid (6b) or somewhere in between, but instead of using a mixer the compartment can be equipped with at least an outlet of the sludge/wastewater at the level of the bottom of the compartment (3a) and at the level of the liquid (3b) and alternatively or additionally somewhere in-between. During aforementioned feeding and anaerobic selector operation, the sludge/wastewater is removed from the selector compartment through 3b. After the anaerobic contact time is achieved, the feeding is continued for a desired period, but now the sludge/wastewater is removed from the compartment through 3a, so that the mixture 3 containing the larger sludge particles are fed to the continuous flow-through biological reactor. In this variant, removing the conditioned sludge/wastewater from the compartment can also effectively be achieved by supplying the sludge into the selector compartment through 6b.

With embodiments elaborated above and as shown in FIGS. 2-8, and all conceivable variations thereof described above, a continuous feed of sludge to the biological reactor B is possible.

Figure 9A:
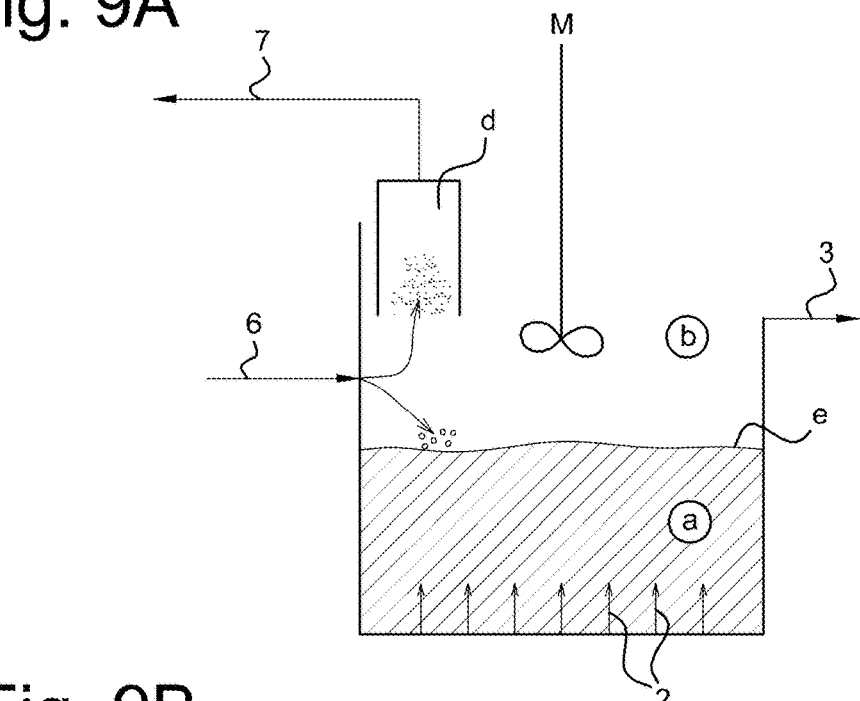
FIG. 9A shows a variant ofthe reactor with one, intermittently operated, selectortank/compartment and without provisions for flow rate differentiation.
Figure 9B:
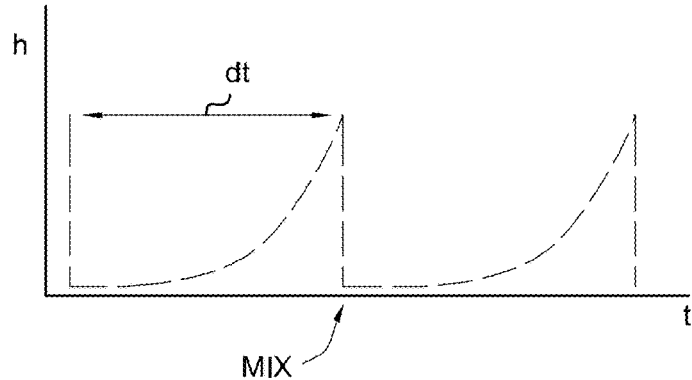
FIG. 9B shows a plot of a height of zone a overtime in the reactor of FIG. 9A

The skilled person will recognize that if a continuous feed of sludge to the biological reactor B from the selector S is not essential for the operation of the biological reactor, the same advantages of the process according to the invention can be achieved using only one, intermittently operated, selector tank/compartment and without provisions for flow rate differentiation (e.g., deflection baffles). This embodiment is shown in FIG. 9A. In this preferred variant, the selector S is first filled in a short time with (return) sludge 6. After which the selector S is vertically fed with feed 2 at a lower flow rate. During this feeding, the larger sludge particles concentrate towards the bottom of the selector and the smaller are flushes out, which create the distribution in sludge residence time. During feeding, substrate from the wastewater is taken up by the sludge. Initially, the rapidly degradable substrate (such as fatty acids) present in the fed wastewater is almost completely absorbed by the larger sludge particles at the bottom of the selector. As a result, this substrate is no longer available for the smaller sludge particles higher up in the selector. Only when the MO in the larger sludge particles are completely saturated with substrate, and the sludge particles can no longer absorb substrate, does substrate become available for the MO in the sludge particles higher up in the selector. This is shown in FIG. 9A by the marking. The sludge in the marked 'zone a' in the figure is in contact with the substrate, while the sludge in 'zone b' is not. The height of zone a increases over time. This is shown schematically in FIG. 9B. The horizontal axis is the time since feeding of the wastewater and the vertical axis shows the height of the substrate front (boundary e between zone a and b). As soon as this substrate front has reached the top of the selector, the maximum effective contact time between sludge and wastewater has been reached (time-dt in FIG. 9B) and the mixer M is started by which the sludge flushes to reactor B, after which the above steps are repeated.

For all the mentioned preferred variants, the return sludge can also introduced into the selector intermittently or at different flow rates.

It goes without saying that all the above-mentioned preferred variants can also be used in the sludge return line parallel to the purification reactors with only a part of the return sludge. In this case, the proportion of the return sludge treated in the selector S is preferably more than 30 wt %, more preferably more than 50 wt % and most preferably more than 70 wt %.

All the previously presented preferred variants, are preferably combined with the separation and discharge of the smallest or worst settling sludge particles, in sludge discharge 7. Mechanical or gravity separators can be used and such separators are usually located in the return sludge, in the selector S but can also be used parallel to the biological reactor B or between B and the final settling tank NB. Granulation in the continuous purification is further stimulated by using such separators in combination with the optimization of residence and contact time distribution in selector S.

Preferably, this sludge discharge of the smallest and poorest settling sludge particles is at least 30 wt % of the total amount of sludge discharged from the continuous purification process (surplus sludge) and more preferably at least 40 wt % and more preferably at least 60 wt % of the surplus sludge. Preferably, the average size of the separated and thus discharged smallest sludge particles is at most 0.4 mm or even more preferably at most 0.2 mm. Doing so, the proportion of granular sludge is increased.

As mentioned above, this selective discharge (see also FIG. 1) can take place at various places in the activated sludge system, such as inbetween activated sludge reactor B and secondary settling tank NB, in the final settling tank NB, in a return line of the activated sludge system, but also in the anaerobic selector S. All embodiments of the Selector S preferably also have means for separating and discharging the smallest or poorest settling sludge particles. In one variant, means such as a discharge are located at the top of the Selector S. For example FIG. 9A shows how in Selector c selective discharge can take place at the top of the sludge bed. This upper part of the tank especially contains the smallest sized sludge and by discharging from the upper part of the tank, the smallest particles are thus separated from the larger sludge particles that are more towards the bottom of the tank. FIG. 2b shows how the sludge discharge 7 takes place in the upper part of compartment Sb, where the concentration of sludge with the smallest dimensions is highest and FIG. 9A shows how the sludge with the smallest dimensions, e, is discharged through the sludge discharge 7.

DETAILED DESCRIPTION OF THE INVENTION

The invention relates to a method for purifying substrate-containing wastewater in a continuous flow-through aerobic biological purification reactor, wherein at least part of the biological sludge is conditioned in a selector under anaerobic or anoxic conditions with at least part of the substrate-containing wastewater (whether or not after a conventional pre-treatment step of the received wastewater), such that at least 20 wt % of the sludge in the selector has a residence time in the selector that is at least 20% greater than the hydraulic residence time of the sludge/water mixture in the selector, and wherein preferably the larger sludge particles are in contact with the highest substrate concentration, after which the conditioned sludge/water mixture thus conditioned (whether or not after an eventual additional anaerobic or anoxic step) is fed to the aerobic purification reactor and subjected to (conventional) aerobic purification, wherein the treated (purified) wastewater after aerobic purification is separated from the sludge by settling, flotation or mechanical separation.

In particular, the invention relates to a method for purifying substrate-containing wastewater in a continuous flow-through aerobic biological purification reactor B, wherein at least part of the biological sludge 6 is conditioned in a selector S under anaerobic or anoxic conditions with at least a part of the substrate-containing wastewater 2 to be treated (whether or not after a conventional pre-treatment step VB of the supplied wastewater), such that at least 20% of the sludge in the selector has a residence time in the selector which is at least 20% greater than the hydraulic residence time of the sludge/water mixture in the selector, after which the thus conditioned sludge/water mixture 3 (whether or not after any additional anaerobic or anoxic contact time) is fed to the aerobic purification reactor B and subjected to (conventional) aerobic purification, where the treated (purified) wastewater 4 after aerobic treatment is separated from the sludge by settler NB, flotation or mechanical separation, and (at least part of) the sludge separated from the aerobically treated wastewater is returned to the selector as return sludge 6. A part of the sludge, preferably with the poorest settling sludge particles, can be purged as sludge discharge 7. Reference is made to FIG. 1 herein.

In the context of the invention, the terms 'purifying' wastewater and 'treating' wastewater are used interchangeably.

In the above method, the sludge is segregated in the selector under anaerobic or anoxic conditions, based on difference in settling rate, and it is controlled that the larger sludge particles (characterized by higher settling rates) obtain a longer contact time with the wastewater and that the larger sludge particles come into contact with a higher substrate concentration in the wastewater than the smaller sludge particles. This can be achieved, for example, by applying in the selector (i) multiple phases with discrete or discontinuous changes in flow velocity, (ii) an increasing flow gradient (ie continuously increasing flow velocity), or a combination of (i) and (ii).

In one embodiment, the sludge/water mixture in the selector is subjected to discrete changes in flow velocity and/or a flow gradient under anaerobic or anoxic conditions. In a particular embodiment, discrete changes in flow velocity are achieved by discrete variation in flux in the flow direction of the selector and/or by discrete variation in flow rate of the supplied wastewater and/or return sludge.

Advantageously, starting from traditional activated sludge, granular sludge is produced by the aforementioned method, preferably within 200 days after start-up, more preferably within 100 days after start-up of the method. As described above, since granular sludge settles considerably faster than sludge flocs, a significantly smaller settler can be used and/or significantly more sludge can be maintained in the purification process, resulting in a more extensive purification of the wastewater. In the presented process, granular sludge is obtained in a continuous flow-through wastewater purification process and a smaller settling volume or higher upflows can be used while still maintaining effective separation of sludge and treated water. Furthermore, the volume of anoxic tank between the anaerobic and aerobic zone or anoxic compartments within the aerobic treatment reactor can be reduced or such anoxic tanks/compartments are not required, as well as the need to recycle water/sludge from the aerobic zone into the anoxic zone and into the anaerobic zone, while extensive removal of nitrogen compounds from the wastewater is still achieved.

In one embodiment, an anoxic reactor compartment or reactor zone between anaerobic and aerobic steps (a) and (b) can be excluded.

As described above, the invention relates in particular to a method for continuous flow-through wastewater purification, wherein wastewater 1 is optionally pre-treated in a primary settling tank VB and the pre-treated wastewater 2 subsequently:

(a) is contacted in a selector S with biological sludge 6 under anaerobic conditions to obtain a mixture of wastewater and sludge, wherein the selector S controls and/or ensures that at least 20% of the sludge in the selector has a residence time in the selector that is at least 20% greater than the hydraulic residence time of the sludge/water mixture in the selector, (b) wherein the stream 3 with the sludge conditioned in the selector is then fed to an aerobic purification reactor B, and (c) wherein optionally (by settling NB, flotation or mechanical separation) sludge is separated from the wastewater, to obtain treated wastewater 5, and (at least part of) the separated sludge is recycled as return sludge 6 to step (a), back to the selector S, and part of the sludge, preferably the part with the poorest settling sludge particles, can be purged from the treatment process as stream 7. This sludge purge 7 can take place at different locations within the treatment process, or a combination of locations.

Doing so, the selector controls that larger, faster settling sludge particles are longer in contact with, and with higher concentrated, substrate-rich wastewater than the smaller, more slowly settling sludge particles. As a result, the MO in these larger sludge particles can absorb more and longer substrate than the smaller sludge particles with a shorter residence time and less contact with high substrate concentrations. This results in a competitive advantage for the growth of MO that stimulate granular growth and subsequent the formation and stable maintenance of granular sludge in the continuous flow-through purification process.

It is preferred that at least 40% and more preferably 50-90% of the sludge in the selector has a residence time in the selector which is at least 20% greater than the hydraulic residence time of the sludge/water mixture in the selector.

If no pre-treatment is required, wastewater flows 1 and 2 are identical and interchangeable.

In one embodiment, it is preferred that at least 40% and more preferably 50-90% of the sludge in the selector has a residence time in the selector which is at least 40% greater than the hydraulic residence time of the sludge/water mixture in the selector.

It is preferred that the selector conditions the sludge-wastewater mixture such that the proportion of granular sludge in the aerobic biological purification reactor B amounts to at least 25 wt %, preferably at least 30 wt % and most preferably at least 40 wt %, particularly at least 50 wt %; and preferably such that at least 20 wt % of this granular sludge (i.e. sludge with a size of at least 0.212 mm), or more preferably at least 25 wt %, preferably at least 30 wt % and most preferably at least 40 wt %, particularly at least 50 wt % of this granular sludge in the aerobic biological purification reactor B has a particle size of at least 0.4-1.0 mm.

In a preferred embodiment, the improved granular sludge size distribution and sludge residence time distribution according to the invention is accomplished by using a selector S that applies discrete or discontinuous changes in the flow velocity, preferably a selector S with different compartments (Sa, Sb, etc.) with its own flow velocity, wherein the flow velocity in a subsequent compartment is always 25-50% of that in the preceding compartment.

More preferably, the Selector S is an upflow reactor with a concentric collection of compartments, with an inner, first compartment Sa and at least one or more further compartments (Sb, Sc, etc.) oriented concentrically around it, which are always at the bottom and top fluid connected with the previous compartment, in which a supply for (return) sludge 6 is located at the lower part of the first compartment S, and each subsequent compartment has an inlet for a wastewater 2 into the lower part such that sludge and wastewater 1 are brought into contact with each other, whereby the selector provides a vertical flow ('upflow') in the compartments. The skilled person can choose the diameters of the different compartments in such a way as to achieve the desired difference in flow velocity between adjacent compartments. In this way (a1) the mixture is selected by settling velocity and a first portion of sludge S1, comprising slower settling sludge, is brought to the second compartment via the overflow, while a second portion of sludge S2, comprising faster settling sludge, is collected at the bottom and brought into the second compartment via the connection at the bottom, wherein preferably the faster settling sludge S2 in the second compartment is brought back into contact with wastewater at a lower flow velocity, and the process of separating faster settling sludge S3 at the bottom side and connection with a third compartment and slower settling sludge S4 via the overflow to the third compartment is repeated. In this way, the contact time of the faster settling sludge with the wastewater is increased and it is also achieved that the largest sludge particles experience the highest substrate concentration and can preferentially adsorb substrate for the formation of granular MOs. Reference is made to FIG. 2A for further explanation.

In one embodiment, the selector S is an upflow reactor with 3 adjacent and interconnected compartments Sa, Sb and optionally Sc with adjusted volumes, where the effective volume of compartment Sa is smaller than that of Sb, where biological sludge 6 and to-be-purified substrate-containing wastewater 2 flow successively from Sa to Sb and from Sb to Sc, which compartments are always at the bottom and top fluid connected with the previous compartment, in which a supply for (return) sludge 6 is located in the lower part of the first compartment, and each subsequent compartment has an inlet for a wastewater into the lower part 2 such that sludge and wastewater 1 are brought into contact with each other, whereby the selector provides a vertical flow ('upflow') in the compartments. Reference is made to FIG. 2B for further explanation.

In a method according to the invention, variation of flow rate in the selector is achieved by varying the feed rate of the wastewater 2. The inventors have found that fluctuation of the wastewater flow rate 2 during the day can provide a further improve the sludge residence time distribution. Especially during periods with lower supply, the best settleable sludge particles accumulate around the bottom of the different compartments and thus make maximum contact with the most concentrated, least diluted wastewater. This makes the distribution of sludge residence time of the sludge in the selector even more profound.

In a method according to the invention, variation of flow velocity in the selector is achieved by varying the flow rate of the sludge 6.

In a preferred embodiment, granulation is further stimulated by not only effecting the distribution of the sludge age in the selector, but also promoting the growth of the granulating MOs by increasing the substrate concentration present in the supplied wastewater by dosing a suitable external carbon source or by pre-treating the supplied wastewater through such process such as hydrolysis, fermentation, etc. In this way the proportion of rapidly biodegradable substrate, such as fatty acids, is preferably increased to at least 15% of the total substrate concentration, or more preferably to at least 25% of the total substrate concentration. In one embodiment, the concentration of substrate is increased by dosing an external carbon source, a side stream from the sludge processing line that is part of the treatment plant where the biological purification reactor is in use, or by pre-treating the wastewater in whole or in part by means of hydrolysis or fermentation.

There are no restrictions to the wastewater source. The wastewater to be treated with the method according to the invention typically contains an organic nutrient (organic substance), also referred to in the context of the invention as substrate-containing wastewater. Typically, the biochemical oxygen demand (BOD) of the incoming wastewater is a minimum of 50 mg/l, such as 100-10,000 mg/l. Any type of wastewater, such as sewage or water from industrial production processes, can be treated in accordance to the invention. The method according to the invention can therefore also be referred to as wastewater treatment. The wastewater subjected to the process according to the invention may be pretreated prior to step (a), such as wastewater that has undergone primary treatment as known in the art, although primary treatment will not always be necessary to run the current process efficiently. Typical wastewater pretreatment techniques include one or more of the following: purification, removal of coarse suspended solids, removal of grease and primary sedimentation.

In one embodiment, the proportion of rapidly biodegradable fatty acids in the wastewater source is less than 10-15 wt % of the total amount of substrate/nutrient and/or there is a fluctuation in the fatty acid concentration in the supplied wastewater whereby this proportion is at least 20% of the time less than 10-15 wt %. The inventors found that low fatty acid concentrations and variations therein, complicate continuous wastewater treatment based on granular sludge technology; the use of selectors in accordance to the invention makes continuous wastewater purification based on granular sludge technology manageable.

The selector S according to the invention is part of the anaerobic zone. In a preferred embodiment, the selector S forms the (only) anaerobic zone. The conditions in the selector S are called "anaerobic" because no oxygen is added. As described above, it is also possible that the conditions in the selector S are anoxic. In anoxic conditions, in addition to organic contaminants, oxidized nitrogen compounds such as nitrite and nitrate are also present, and MO can flourish that convert these into harmless nitrogen gas. Under anaerobic conditions, the concentration of such oxidized nitrogen compounds is limited or not present at all. Under such conditions, MO can flourish that store phosphate. Within the anaerobic zone, the conditions and residence time of the wastewater are such that the sludge granules can absorb organic nutrients from the incoming wastewater. These organic nutrients are typically stored in the microorganisms in the form of polymers, such as polybeta-hydroxybutyrate (PHB). Typical mean residence times for the mixture of sludge and water in the anaerobic zone of step are 15 min-5 hours, preferably 30 min-2 hours.

As stated in the introduction, granular sludge is defined in the prior art as sludge with a size of at least 0.212 mm (and typically smaller than 6 mm) and which does not coagulate during settling, and hence the SVI after 5 minutes of settling is comparable to that after settling for 30 minutes. Flocculent sludge has smaller sizes. Although small amounts of flocculent sludge may be present in the wastewater purification system according to the invention, the method aims to reduce the proportion of flocculent sludge. Since flocculent sludge has less residence time in the selector S and also has less contact with the substrate in the Selector—and certainly not with that with the highest substrate concentrations in the Selector—, its growth is not promoted and the fraction of flocculent sludge remains in the minority. With the current process, the proportion of flocculent sludge, with a size of 0.212 mm or smaller, is preferably limited to a maximum of 50% by weight, preferably less than 40% by weight, more preferably less than 30 wt %. The current process runs smoothly with such limited amounts of flocculent sludge, and in addition, the amount of flocculent sludge can be further reduced by in particular removing sludge through the sludge discharge 7 (the surplus sludge discharged from the purification system to prevent sludge accumulation due to continuous sludge growth) that has less rapid settling properties, for example by withdrawing this sludge as far as possible from the inlet in the secondary settling tank, or by extracting this sludge in the selector at places where the proportion of faster settling sludge is small or and/or by applying a gravitational or mechanical separator in the return sludge or parallel to the aerobic reactor or selector and purging the smallest sludge thus obtained.

In the context of the invention, the terms "faster settling sludge" and "heavy sludge" are considered synonymous, as are the terms "slower settling sludge" and "light sludge." Settlement rates or settling velocities are commonly determined in the art. A practical measure of the settling rate known in the art is the sludge volume index (SVI). SVI is defined as the volume (in ml) occupied by 1 gram of sludge after a certain settling time. Typical values for the ratio of the SVI after 5 minutes settling (SVI-5) over the SVI after 30 minutes settling (SVI-30) for the granular sludge according to the invention are lower than 3, typically in the range 1-2.5, more typically approx. 1.5, while conventional flocculent sludge has an SVI-5/SVI-30 ratio of greater than 3.

In view of the presence of micro-organisms, the sludge present in the system according to the invention can also be referred to as "activated sludge". The microorganisms necessary for the process according to the invention can be found in the sludge of conventional wastewater treatment plants. They do not need to be isolated, as the conditions set by the invention controls that these micro-organisms remain part of the granular sludge.

The mixture of wastewater and sludge leaving the Selector S is then transferred to the aerobic reactor B, to which oxygen molecules is supplied (aeration), eg using aerators as known in the art. The average residence times of the mixture of sludge and water in the aerobic reactor B can vary widely, depending on e.g. the amount and type of contamination in the incoming wastewater and the desired degree of purification, and are typically 1-30 hours, preferably 2-20 hours. The average residence times of the sludge also vary depending on e.g. the amount and type of contamination in the incoming wastewater and the desired degree of purification, and are typically 3-40 days, preferably 5-20 days. Aeration of the aerobic zone is carried out at such a rate that the concentration of dissolved molecular oxygen in the wastewater in the reactor B is preferably at least 0.5 mg/l and more preferably at least 1 mg/l, while preferably not being higher than 5 mg/l, more preferably not higher than 10 mg/l. It is not part of the invention to modify the traditional aerobic reactor and the aerobic conditions herein. In addition to aerobic zones or compartments, reactor B may also have zones and compartments in which anoxic conditions occur, with which denitrification and further removal of nitrogen compounds from the wastewater are achieved.

Subsequently, the biologically purified wastewater is preferably separated from the mixture of sludge and water from reactor B. This is usually achieved by settling (secondary settling NB), but this can also be achieved by mechanical separation, by flotation, by filtration or otherwise. Such settling and separation step, in which the sludge is separated from the treated water, is common in conventional wastewater treatment plants. Due to the presence of granular sludge rather than flocculant sludge, the settling tanks can be much smaller (e.g. about a quarter in area for the same input of wastewater) compared to the conventional tanks required for settling of flocculent sludge. The incoming mixture of water and sludge from reactor B remains in the settling tank or similar separator for a sufficient time. Once the sludge has been separated from the water, the biologically treated wastewater is sufficiently clean to be discharged to the environment, although for some applications and/or locations additional further treatment, such as filtration or removal of e.g. metals, may be desirable.

The water treated according to the invention, which is discharged from the clarifier or similar separator, is the main product of the process according to the invention. Compared to the incoming wastewater, the purified water is extracted from organic matter (organic nutrients). The treated water can be discharged to the environment, be further purified or used utilized as desired.

In the method described above, sludge is selected naturally in such a way that starting from conventional activated sludge, preferably within 200 days after start-up, more preferably within 150 days after start-up, granular sludge formation takes place and during the purification process consistently comprises the majority of the sludge. The formation of a majority of granular sludge can be accelerated and supported by initially starting the purification process with sludge that already comprises at least part of granular sludge. Preferably, the proportion of granular sludge in the sludge which is added during the start-up to the system amounts to at least 15% by weight, and amounts with a sludge concentration of 3 kg/m$^3$ preferably to more than 0.6 kg/m$^3$. More preferably, it is started-up with sludge of which more than 50% already is granular sludge.

Also, the formation and stable maintenance of granular sludge can be accelerated and supported by continuously or occasionally adding a solid or chemicals to the sludge to which the sludge particles can adhere and thereby increase its size or weight. This solid support material preferably has a size of 0.05-2.5 mm and a specific gravity comparable to, or greater than, that of the wastewater. This material can be, for example, granular sludge from another reactor, sieved activated sludge, classified sand, plastic granulate or other natural or synthetic material. For example, a solid with a specific gravity of at least 1.05 kg/l is added to the sludge. The MO is the sludge will adhere to this substance, causing the density of the sludge particle, and thus the settling rate, to increase. A similar effect is achieved by dosing liquid chemicals such as, for example, iron salts, aluminium salts, calcium salts, etc. such that the salts in the sludge/water mixture react to form a solid.

Figure 10:
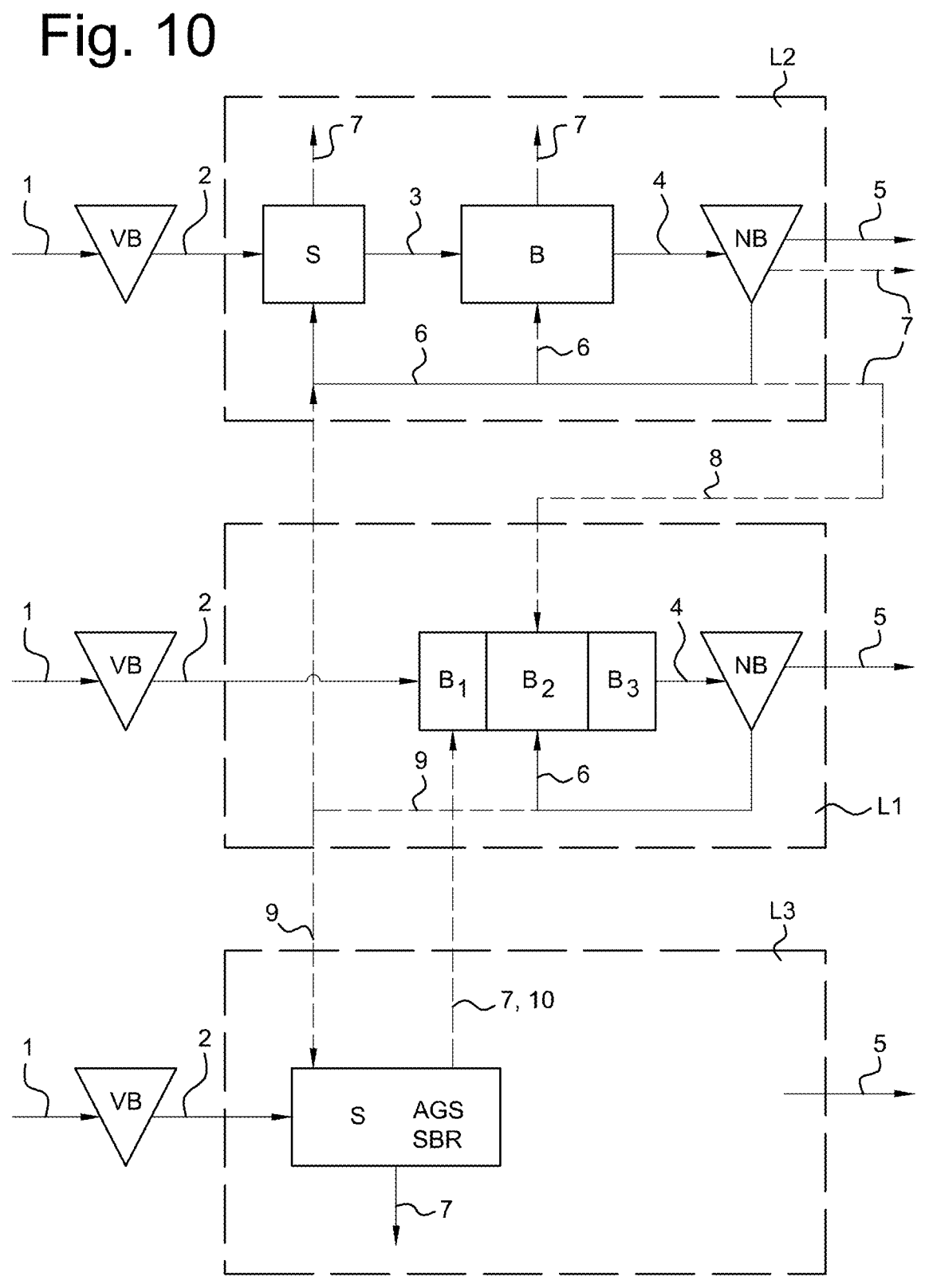

The invention can also be applied in parallel with a conventional treatment which has no provisions for the formation of granular sludge formation, or which does not allow extensive granule formation. This is shown in FIG. 10. Herein, purification line L1 is the conventional purification, which biological reactor comprises one or more compartments or reactors that enable different combinations of aerobic, anoxic and anaerobic process conditions. In the figure this is indicated as B1, B2 and B3, but it can also be more or less parts. Purification line L2 is a method according to the invention. By connecting a discharge-sludge line from L2 to L1, the purification line in accordance with the invention also has a synergistic effect on the operation, the sludge properties and the MOs of the conventional purification line. This is achieved by not discharging the sludge (7) from the purification line L2 to the sludge processing, but by transferring it wholly or partly to one or more of the biological reactor components (line 8). After all, this discharge sludge has better biomass properties with larger sizes and more simultaneous denitrification capacity than the regular sludge in the conventional line and will thus improve the sludge properties in, and operation of, the conventional line. This synergistic effect can be further enhanced by feeding part of the return sludge 6 and/or the sludge discharge 7 from the conventional line L1 to L2 via line 9. In this way, part of the sludge of the conventional line is also subjected to the action of the selector S of line L2. The result of the above-described connection of the two purification lines is, that also in line L1 an improved effect and larger sludge particles are obtained, without all the wastewater and sludge having to be treated by the innovative selector S and without L1 having to be retrofitted into a purification in accordance with the invention. In one embodiment, the method according to the invention includes a step of feeding the waste sludge 7 (as 8) to a conventional treatment, preferably a treatment which has no means to achieve granular sludge. In another embodiment, the method according to the invention includes a step in which surplus sludge, or part of the return sludge, from a traditional purification is supplied.

In another variant, the same synergistic effect is obtained by following or integrating the selector according to the invention to an aerobic granular sludge (AGS) reactor operating as Sequential Batch System (SBR) and connecting it, as described above, to a continuous flow-through conventional system. This is shown in FIG. 10. Purification line L3 comprises the selector according to the invention as well as the AGS SBR. The sludge discharge from the S-AGS-SBR in L3 (7) is fed via line 10 to the conventional line L1. As with the previously described synergistic coupling, the sludge discharge (7), or part of the return sludge (6), from the conventional line can also be fed to the selector S (via line 9).

On the basis of aforementioned, the invention is also characterized by embodiments in which the selector S is also fed with a part of the return sludge and/or sludge discharge originating from another purification line, or in which the selector S is followed up or integrated with a granular sludge reactor that operates according to the principle of sequential batches. Hence, it is preferred that the selector S is in fluid connection or integrated with a granular sludge reactor operating based on sequential batch principle.

Closely related to this, the invention also relates to a device for purifying substrate-containing wastewater, comprising a selector S with an inlet for substrate-containing wastewater 2, an inlet for biological sludge 6, an outlet for conditioned sludge/water mixture 3 and optionally an outlet for sludge discharge 7, the outlet 3 being in fluid connection with the inlet of a continuous flow-through aerobic biological purification reactor B, which reactor furthermore has an inlet for biological sludge 6, an inlet in fluid connection via the outlet of a selector S, has an outlet for the treated wastewater 4 and optionally an outlet for sludge discharge 7. The outlet 4 may be in fluid connection with the inlet of a clarifier NB, and inlet 2 may be in fluid connection with the outlet of a pre-treatment tank VB, wherein the device is suitable for carrying out the method according to the invention. In particular, the selector S is designed to operate under anaerobic or anoxic conditions and is equipped with means that actively ensure or control that the sludge with larger sizes and/or higher settling velocity is contacted longer with the wastewater in the selector, and with more concentrated substrate-containing wastewater. This can be done e.g. by equipping the selector with means that provide (i) multiple phases with discrete or discontinuous changes in flow velocity, (ii) an increasing flow gradient (ie continuously increasing flow velocity), or a combination of (i) and (ii).

In a preferred embodiment, the method or system operates in parallel to one or more other wastewater purification process lines and wherein selector S receives biological sludge 6 and part of biological sludge 9 from these parallel other wastewater purification process lines, and wherein optionally a part of the biological sludge 6 is directed into these parallel other wastewater purification process lines.

EXAMPLE 1

As a tool for designing and optimizing treatment plants using the invention, the inventors have developed a simulation model that calculates the growth, discharge and size of sludge particles in continuous flow-through biological treatment plant dependent on the extent of sludge residence time distribution within in the selector/anaerobic tank. The model describes the flow of water with substrate through the apparatus, the settling and fluidization of granules and flocs, the uptake of substrate by the biomass, the growth of the granules and the selection (discharge) of flocs and granules.

To illustrate the function and effect of the invention under comparable process conditions, this model was used to simulate the formation of granular sludge and the development of the biological sludge concentration for a conventional continuous flow-through treatment comprising a conventional selector/anaerobic tank, aeration tank, secondary settling tank and sludge return to selector/anaerobic tank. The process conditions were chosen to be representative for modern activated sludge systems. A substrate concentration in the wastewater of 500 mg/l COD (Chemical Oxygen Demand), a specific sludge growth of 0.35 kg/kg COD and a starting situation with conventional flocculent, non-granular sludge, with a homogeneous particle size of 100 μm were assumed. Furthermore, a commonly applied sludge loading rate for this type of systems of 0.2 kg COD/kg ODS/day was assumed. Here, ODS stands for the organic dry matter in the activated sludge in the aerobic reactor, which is a measurement for the amount of MO. This sludge load can also be expressed in biological oxygen demand (BOD) and corresponds to approx. 0.1 kg BOD/kg ODS/day for a conventional wastewater composition.

Figure 11A:
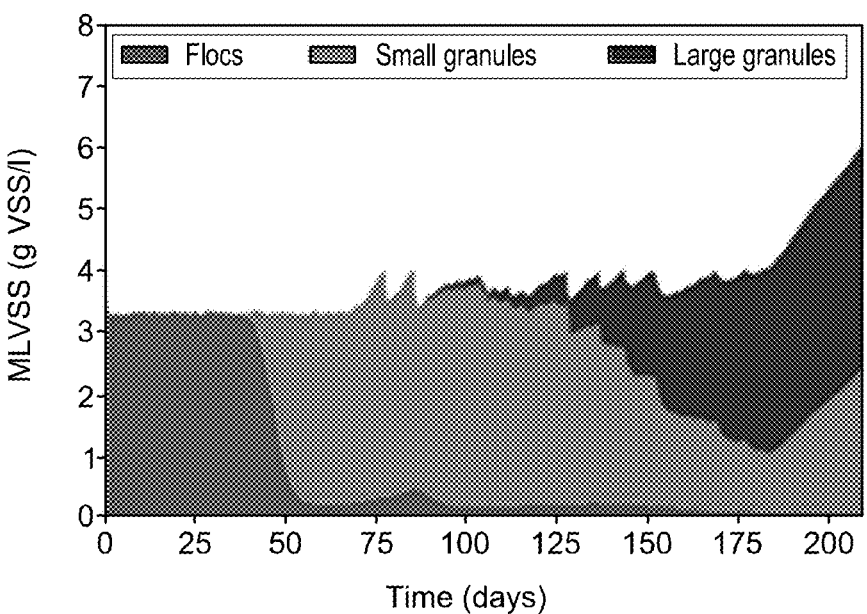
FIG. 11A shows the sludge concentration and sludoe particle size obtained over time with the embodiment according to FIGS. 8A-8B.
Figure 11B:
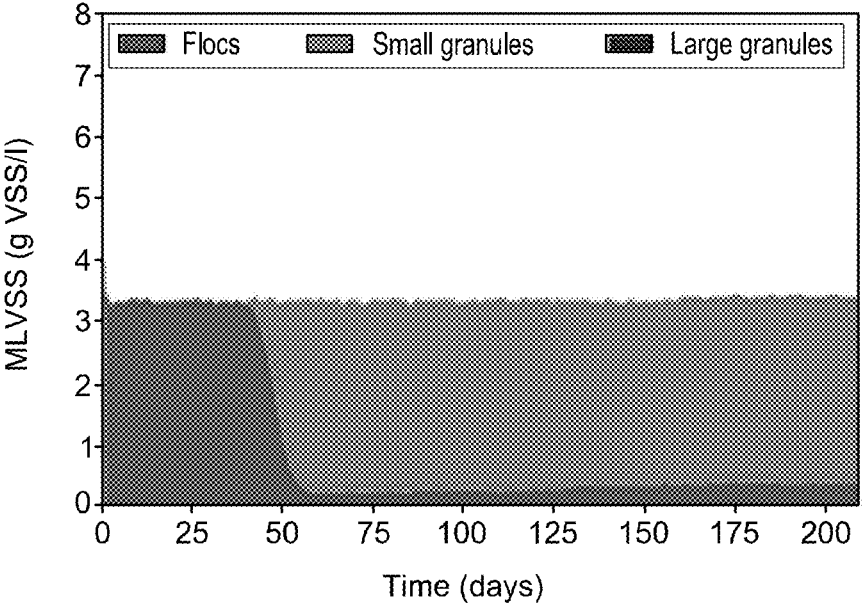
FIG. 11B shows the formation oforanular sludge and the development ofthe biolooical sludoe concentration for a conventional continuous flow-through treatment comprising a conventional selector/anaerobic tank, aeration tank, secondary settling tank and sludoe return to selector/anaerobic tank.

The results in the course of over 200 days are shown in FIG. 11B. Here the size of flocs is <200 μm, "small granules" have a size of 200-400 μm and "large granules" are classified as >800 μm. The figure shows that after about 50 days the initial size of the sludge particles of 100 μm grows into small granules, but that further granulation did not take place (no "large granules"). Also, the total concentration of organic biologically active biomass (the MVLSS on the vertical axis) in the reactor remained around 3.2 g ODS/l). The results of the simulation corresponded very well with the practical experience with the start-up of conventional continuous flow-through granular sludge systems as well as the experimental results of the inventors' long-term pilot trials with these types of systems.

The same model, with exactly the same parameters and settings, was then used to simulate which sludge concentration and sludge particle size were obtained if the selector/anaerobic tank was designed according to the invention, allowing the largest sludge particles to have longer and more contact with the substrate. The simulation was based on the embodiment as shown in FIGS. 8a and 8b, but other embodiments would give similar results.

The results are shown in FIG. 11A. Here too, after about 50 days, sludge with small granules was formed and the sludge concentration in the system at about 3.2 g ODS/l was comparable to that of the traditional treatment. However, due to the distribution of sludge residence time in the selector/anaerobic tank, in combination with the resulting higher substrate concentration and substrate contact time of the larger sludge particles, there was no steady-state between growth and discharge of the sludge as in the conventional system, but starting at about 80 days an increasing part of the smaller sludge granules grow into large granules. After about 200 days, the majority of the sludge are large granules and, as a result of the greatly improved settling characteristics of these larger granules, discharge decreased and the concentration of active biomass in the purification process increased from 3.2 g ODS/l to approx. 6 g/l.

Figure 11C:
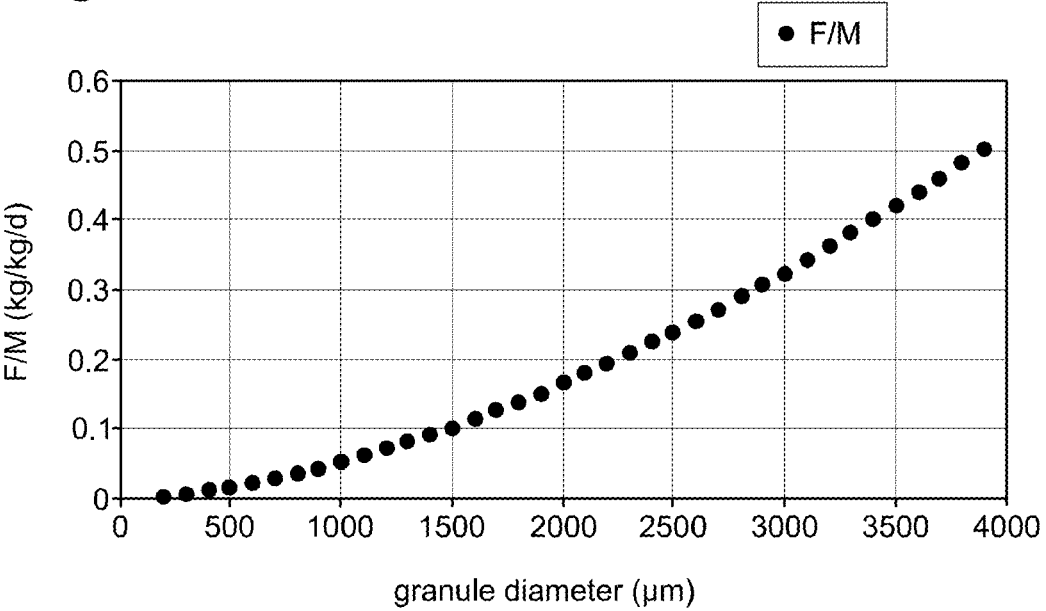
FIG. 11C shows a substrate sludoe loading rate (in kgCOD/kg ODS/day) for sludge granules with different diameters (in micrometer) with the embodiment according to FIGS. 8A-8B.

The model was also used to determine for the different sizes of sludge particles with which substrate concentration they make contact with and for how long. The results of this are shown in FIG. 11C. This figure shows substrate sludge loading rate (in kgCOD/kg ODS/day) for sludge granules with different diameters (in micrometer). Whereas in the traditional purification process the sludge experiences the same contact time with the same substrate concentration resulting in a sludge load of 0.2 kg/kg ODS/day, in the process according to the invention a large distribution occurred, whereby the granules with the larger sizes not only are exposed longer but also to higher substrate concentrations. As a result, the sludge loading rate for the large sludge particles was significantly higher than for the average sludge, and even higher than for the smallest particles. Due to this higher sludge loading rate, the sludge particles with the largest size grew faster than the smaller ones resulting in more extensive granulation.

It is noted that similar model calculations were also performed for other process conditions, such as higher or lower sludge load, a higher or lower substrate concentration of the wastewater, or other embodiments of the traditional purification method or the method according to the invention. Likewise, as in above example, the results of those calculations unambiguously illustrated the effectiveness and main advantages of the invention. For example, the invention enables to achieve more extensive granulation in a continuous flow-through purification systems and thus to operate the system with more active biomass. Such higher concentration of biomass enables that more wastewater can be treated within the same treatment volume, or leads to a better purified water quality. In addition, due to the better settling behaviour of the larger granules, the secondary settler can be made significantly more compact, or the same secondary settler can purify more wastewater. This results in lower construction and operational costs for the wastewater purification. Above all, the granule size is such that simultaneous nitrification and denitrification can take place during aeration, which not only greatly reduces energy consumption but also further lowers construction costs since various circulating flows and separate anoxic compartment/tanks are no longer needed.

EXAMPLE 2

The advantages of the invention were also clearly demonstrated in a pilot plant operation. This pilot plant comprised a selector zone of a series of 6 mixed anaerobic compartments (selector $S_A$-$S_F$) of 0.075-0.15 m³, a series of 6 mixed anoxic/aerobic reactor compartments (reactor $B_A$-$B_F$) each of 1 m³, and a clarifier of 0.32 m³. The last reactor compartment $B_F$ also contained a partially submerged manifold for periodic discharge of sludge after a settling period, aiming for increased retention of better settling sludge. A fraction of the return sludge could also be discharged as surplus sludge. Positive displacement pumps were used for recirculation of mixed liquor (from an aerobic to an anoxic zone) or return sludge (from the clarifier to the anaerobic selector). The return sludge could be split between the anaerobic selector and the first aerobic/anoxic compartment. Mixed aerobic/anoxic compartments were equipped with fine bubble aeration and course bubble aeration that could be controlled independently. Sludge was suspended through mechanical agitation in all mixed compartments. With this pilot various configurations of flow-through granular activated sludge system configurations were tested.

Inventors first operated the pilot in a configuration that represents the current state of art. This current state of art was considered to be a multi-stage activated sludge process with plug-flow anaerobic selector and the use of selective sludge discharge. The configuration was as follows:

1. Inflow of wastewater and return sludge into selector tank $S_A$ and successively flowing through selector tank $S_B$, $S_C$, $S_D$, $S_E$ and $S_F$. Working volume of each tank was 0.075 m³;
2. Reactor $B_A$: anoxic;
3. Reactor $B_{B-E}$: aerobic, operated at a dissolved oxygen concentration (DO) of 2 mg/l;
4. Reactor $B_F$: aerobic, equipped submerged manifold for selective sludge discharge, with the sludge settling selection criterion set to 3 m/h; and
5. Clarifier.

The pilot set-up was fed with municipal wastewater after the primary clarification stage. The primary effluent contained on average 425 mg/l chemical oxygen demand (COD), 8.1 mg/l Phosphorus (P), 6 mg/l P, 51 mg/ammonium (N) and 110 mg/l total suspended solids (TSS). The influent flow rate varied from 250-500 l/h, while the sludge return factor from the clarifier to the anaerobic selector varied between 0.5-1.0. The flow rate of the anoxic recycle from reactor $B_E$ to $B_A$ was equal to the flow rates of influent and return sludge combined. Prior to start of the experiment the reactors were inoculated with aerobic granular sludge originating from Nereda® reactors.

During the experiment the sludge settling characteristics and sludge size distribution was monitored. In order to distinguish between flocculant and granular sludge, a sieve of 200 micron was used to classify the sludge sample before measuring the dry solid level of that classified fraction.

The experiment was repeated with the same configuration and similar flows and wastewater composition, but now using two selectors $S_A$ and $S_B$ of 0.375 m³ each, in accordance with the configuration as presented in FIG. 8b. Both selector tanks were operated in anti-parallel cycles. While one column received wastewater, the other received return sludge from the clarifier. The pilot set-up was again seeded with aerobic granular sludge originating from Nereda® reactors.

Figure 12A:
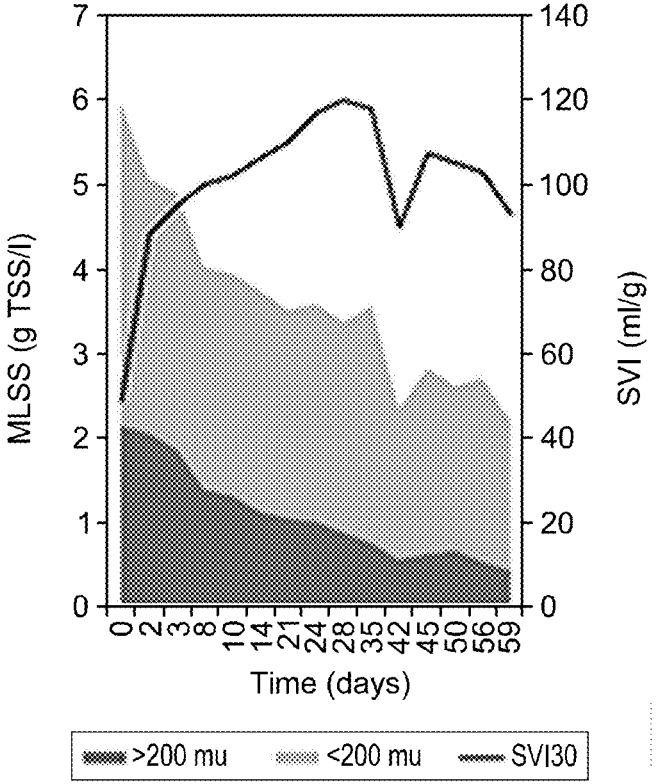
FIGS. 12A-12B plot the development overtime of sludge volume index and sieve fractions in flow-throuoh pilot-scale set-up after seedino with aerobic granular sludge, with FIG. 12A showing the state of the art configuration.
Figure 12B:
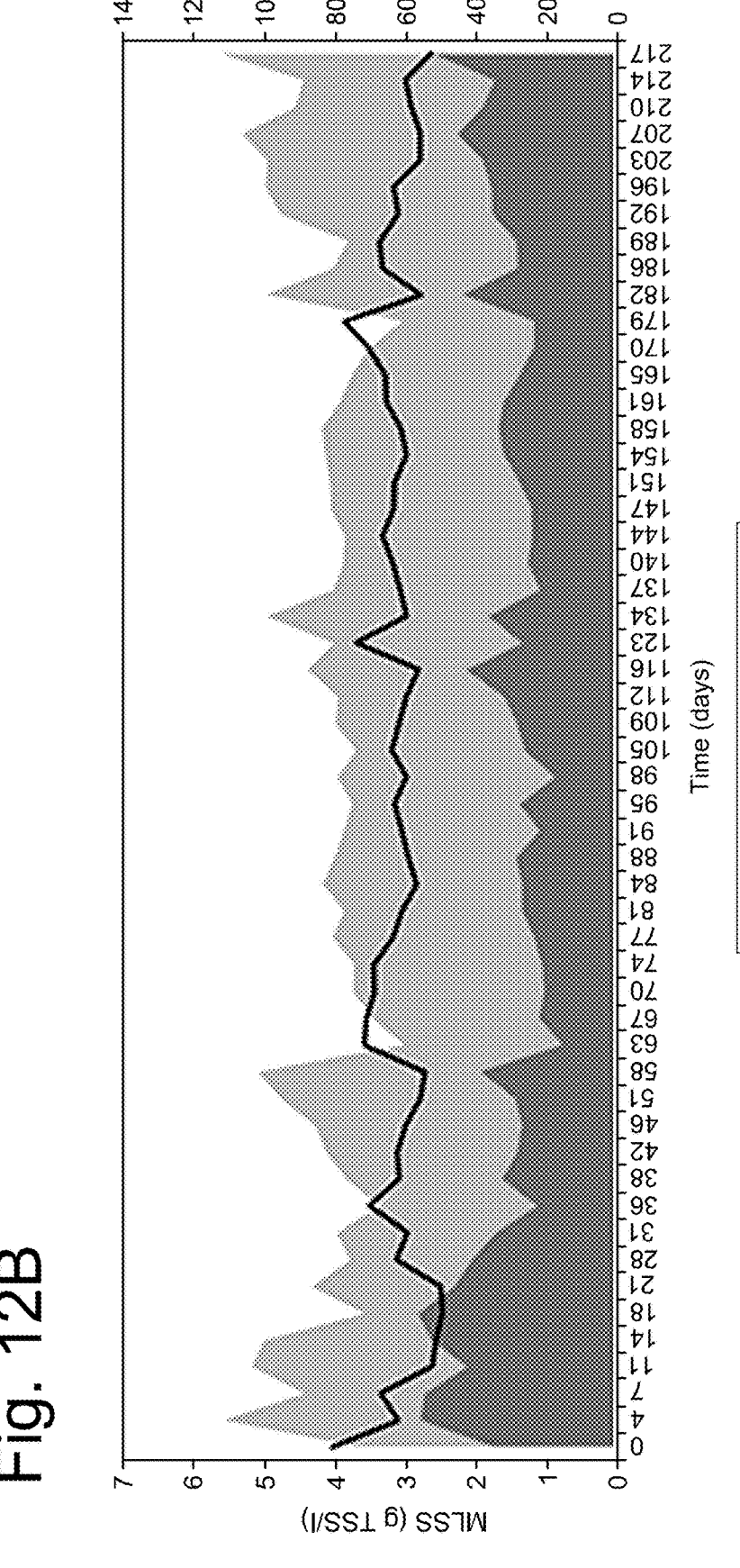

FIGS. 12a and 12b plot the development over time of sludge volume index and sieve fractions in flow-through pilot-scale set-up after seeding with aerobic granular sludge, for (a) state of the art configuration; and (b) a configuration according to FIG. 8b. As can be seen from FIG. 12A, both the level of granules within the sludge declined and the $SVI_{30}$ increased from levels typical for granular sludge to levels typical for flocculent sludge within two months. Clearly, the granular MO were outcompeted by flocculant growing MO. Also the total amount of sludge reduced from approx. 6 g/l TSS to approx. 2.5 g/l TSS. With the use of selectors in accordance with the invention, contrary to first described experiment, the amount of granules did not decline substantially and a granular size of 1 mm was maintained during the full duration of the experiment (more than half year): FIG. 12b. Also, the $SVI_{30}$ remained relatively constant and in line with sludge with good settling characteristics. In addition, the sludge concentration maintained amounted to approx. 4-5 g/l TSS, which was significantly higher than in the experiment with state of the art configuration.

The invention claimed is:

1. A method for the purification of substrate-containing wastewater in a continuous flow-through aerobic biologically activated sludge reactor, wherein substrate-containing wastewater and biological sludge are provided to a selector, to form a sludge/water mixture, wherein at least part of the biological sludge is conditioned in the selector under anaerobic or anoxic conditions with at least part of the substrate-containing wastewater such that at least 20 wt % of the biological sludge in the selector-has a residence time in the selector which is at least 20% greater than the hydraulic residence time of the sludge/water mixture in the selector, to obtain a conditioned sludge/water mixture, by subjecting the sludge/water mixture in the selector under anaerobic or anoxic conditions to discrete changes in flow velocity achieved by varying a feed flow rate of the wastewater and/or by varying a feed rate of the sludge;

after which the conditioned sludge/water mixture, optionally after subjecting it to an additional anaerobic or anoxic contact step, is fed to the aerobic biologically activated sludge reactor where it is subjected to aerobic treatment, to obtain sludge-containing aerobically treated wastewater.

2. The method according to claim 1, wherein the discrete changes in flow velocity are accomplished by discrete variation in flux in the flow direction of the selector and/or by discrete variation in flow rate.

3. The method according to claim 1, wherein at least 40% of the biological sludge in the selector has a residence time in the selector which is at least 20% greater than the hydraulic residence time of the sludge/water mixture in the selector, to obtain the conditioned sludge/water mixture.

4. The method according to claim 1, wherein at least 40%, of the biological sludge in the selector has a residence time in the selector which is at least 40% greater than the hydraulic residence time of the sludge/water mixture in the selector, to obtain the conditioned sludge/water mixture.

5. The method according to claim 1, wherein 40-100% of the biological sludge in the conditioned sludge/water mixture fed to the aerobic biologically activated sludge reactor is granular sludge with a minimum granule size of 0.212 mm.

6. The method according to claim 5, wherein 40-100% of the sludge in the conditioned sludge/water mixture fed to the aerobic biologically activated sludge reactor is granular sludge with a minimum granule size of 0.4-1.0 mm.

7. The method according to claim 1, wherein the biological sludge comprises sludge particles, wherein the 10 wt % largest sludge particles in the biological sludge provided to the selector are contacted with the highest substrate concentration in the substrate-containing wastewater provided to the selector for a time which is at least 20% longer than the average contact time of the biological sludge in the selector, and wherein the substrate concentration in the substrate-containing wastewater that is contacted with the 10 wt % largest sludge particles in the biological sludge is at least 50% higher than the substrate concentration in the substrate-containing wastewater that is contacted with the 15 wt % smallest sludge particles in the biological sludge provided to the selector.

8. The method according to claim 1, wherein a concentration of rapidly biodegradable substrate provided by the substrate-containing waste-water is increased by dosing an external carbon source, by a side stream from a biological sludge processing line that is part of a treatment plant where the aerobic biologically activated sludge reactor is in use, or by pre-treating the substrate-containing wastewater wholly or partially by means of hydrolysis or fermentation.

9. The method according to claim 1, wherein the selector contains at least 2 compartments, in which feeding wastewater and return sludge alternates with discharge of the conditioned sludge/water mixture, and wherein the desired distribution in sludge residence time in the selector is obtained by feeding the compartments with wastewater at the bottom of the compartments and wherein discharge of the conditioned sludge/water mixture can be achieved by one or more of applying variation in flow velocity, applying mixing, and takes place through withdrawing at least a part of the sludge/wastewater at the level of the bottom of the compartments, while optionally providing sludge at the level of the liquid in the compartments and/or somewhere in between the bottom level and the liquid level of the compartments.

10. The method according to claim 9, wherein the selector is operated intermittently.

11. The method according to claim 1, wherein the selector is also fed with a part of the return sludge and/or surplus sludge originating from another purification line.

12. The method according to claim 1, wherein the selector is followed by or integrated with a granular sludge reactor operating based on sequential batch principle.

13. The method according to claim 1, wherein formation of granular sludge is accelerated and/or its maintenance is supported by the addition of a carrier material, said carrier material having an average size of 0.05-2.5 mm and a relative density or specific gravity equal to or greater than that of the wastewater.

14. The method according to claim 1, wherein the substrate-containing wastewater provided to the selector has been pre-treated in a pre-treatment step.

15. The method according to claim 1, wherein the aerobically treated wastewater leaving the aerobic biologically activated sludge reactor is separated from the sludge by settling, flotation or mechanical separation, and wherein at least a portion of the sludge separated from the aerobically treated wastewater is returned to the selector as return biological sludge.

* * * * *